United States Patent
Zebchuk et al.

(10) Patent No.: US 11,635,987 B2
(45) Date of Patent: *Apr. 25, 2023

(54) SYSTEM AND METHOD FOR QUEUING WORK WITHIN A VIRTUALIZED SCHEDULER BASED ON IN-UNIT ACCOUNTING OF IN-UNIT ENTRIES

(71) Applicant: Marvell Asia Pte, Ltd., Singapore (SG)

(72) Inventors: Jason D. Zebchuk, Watertown, MA (US); Wilson P. Snyder, II, Holliston, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,058

(22) Filed: Feb. 24, 2022

(65) Prior Publication Data

US 2022/0179690 A1 Jun. 9, 2022

Related U.S. Application Data

(63) Continuation of application No. 16/553,688, filed on Aug. 28, 2019, now Pat. No. 11,294,715.

(51) Int. Cl.
*G06F 9/48* (2006.01)
*G06F 9/50* (2006.01)

(52) U.S. Cl.
CPC ............ *G06F 9/4881* (2013.01); *G06F 9/50* (2013.01)

(58) Field of Classification Search
None
See application file for complete search history.

(56) References Cited

U.S. PATENT DOCUMENTS

| | | |
|---|---|---|
| 6,401,147 B1 | 6/2002 | Sang et al. |
| 6,748,593 B1 | 6/2004 | Brenner et al. |
| 7,110,359 B1 | 9/2006 | Acharya |
| 7,500,241 B1 | 3/2009 | Flockhart et al. |
| 7,535,907 B2 | 5/2009 | Hussain et al. |
| 7,895,431 B2 | 2/2011 | Bouchard et al. |

(Continued)

OTHER PUBLICATIONS

Microsoft Docs, "Overview of Single Root 1/0 Virtualization {SR-IOV)," Apr. 19, 2017.

(Continued)

*Primary Examiner* — Hiren P Patel
(74) *Attorney, Agent, or Firm* — Hamilton, Brook, Smith & Reynolds, P.C.

(57) ABSTRACT

A system and corresponding method queue work within a virtualized scheduler based on in-unit accounting (IUA) of in-unit entries (IUEs). The system comprises an IUA resource and arbiter. The IUA resource stores, in association with an IUA identifier, an IUA count and threshold. The IUA count represents a global count of work-queue entries (WQEs) that are associated with the IUA identifier and occupy respective IUEs of an IUE resource. The IUA threshold limits the global count. The arbiter retrieves the IUA count and threshold from the IUA resource based on the IUA identifier and controls, as a function of the IUA count and threshold, whether a given IUE from a given scheduling group, assigned to the IUA identifier, is moved into the IUE resource to be queued for scheduling. The IUA count and threshold prevent group(s) assigned to the IUA identifier from using more than an allocated amount of IUEs.

47 Claims, 10 Drawing Sheets

(56) References Cited

U.S. PATENT DOCUMENTS

| | | | |
|---|---|---|---|
| 8,214,835 B2* | 7/2012 | Tsai | G06F 9/4881 |
| | | | 718/1 |
| 8,850,446 B2* | 9/2014 | Avni | G06F 9/4881 |
| | | | 718/103 |
| 8,869,165 B2* | 10/2014 | Dasgupta | G06F 9/5038 |
| | | | 718/106 |
| 8,959,249 B1* | 2/2015 | Love | G06F 3/0611 |
| | | | 710/6 |
| 9,059,945 B2 | 6/2015 | Kravitz et al. | |
| 9,838,471 B2 | 12/2017 | Snyder, II et al. | |
| 10,565,024 B2 | 2/2020 | Dice et al. | |
| 10,884,797 B2 | 1/2021 | Nield et al. | |
| 10,990,440 B2* | 4/2021 | Botelho | G06F 21/44 |
| 11,150,944 B2 | 10/2021 | Burke et al. | |
| 11,237,864 B2* | 2/2022 | Botelho | G06F 9/4881 |
| 11,294,715 B2* | 4/2022 | Zebchuk | G06F 9/5027 |
| 11,409,553 B1* | 8/2022 | Zebchuk | G06F 9/3855 |
| 2004/0221290 A1* | 11/2004 | Casey | G06F 9/50 |
| | | | 718/104 |
| 2006/0056406 A1 | 3/2006 | Bouchard et al. | |
| 2007/0277152 A1 | 11/2007 | Srinivasan | |
| 2009/0083517 A1 | 3/2009 | Riddle | |
| 2009/0320032 A1 | 12/2009 | Avni et al. | |
| 2011/0225583 A1* | 9/2011 | Suh | G06F 9/4843 |
| | | | 718/1 |
| 2013/0070760 A1 | 3/2013 | Shah et al. | |
| 2014/0115591 A1 | 4/2014 | Chen | |
| 2015/0220872 A1 | 8/2015 | Snyder, II et al. | |
| 2016/0283283 A1 | 9/2016 | Jung | |
| 2019/0005576 A1 | 1/2019 | Mick et al. | |
| 2019/0042463 A1 | 2/2019 | Shanbhogue et al. | |
| 2019/0243683 A1 | 8/2019 | Botelho | |
| 2019/0317802 A1 | 10/2019 | Bachmutsky | |
| 2020/0150993 A1 | 5/2020 | Krakirian et al. | |
| 2021/0064421 A1 | 3/2021 | Zebchuk et al. | |

OTHER PUBLICATIONS

Venkatasubramanian et al., "TMT—A TLB Tag Management Framework for Virtualized Platforms", 2009, IEEE, pp. 153-160. (Year: 2009).

* cited by examiner

SYSTEM AND METHOD FOR QUEUING WORK WITHIN A VIRTUALIZED SCHEDULER BASED ON IN-UNIT ACCOUNTING OF IN-UNIT ENTRIES

RELATED APPLICATION

This application is a continuation of U.S. application Ser. No. 16/553,688, filed Aug. 28, 2019, now U.S. Pat. No. 11,294,715. The entire teachings of the above application are incorporated herein by reference.

BACKGROUND

Peripheral component interconnect (PCI) express, also known as "PCIe," is a high-speed hardware interface for connecting to peripheral devices, such as a network interface controller (NIC) or another device. A single root I/O virtualization (SR-IOV) interface is an extension to the PCIe specification. SR-IOV allows a device, such as the NIC or other device, to separate access to its resources among various PCIe hardware functions, namely, a PCIe physical function (PF) and one or more PCIe virtual functions (VFs). A PF is the primary function of the device and advertises the device's SR-IOV capabilities. The PF is associated with a parent partition of a hypervisor in a virtualized environment.

The virtualized environment enables creation of multiple simulated environments with dedicated resources from a single, physical hardware system. The hypervisor is software that enables hardware resources of the physical hardware system to be separated into distinct and secure environments known as virtual machines (VMs). A virtual machine (VM) relies on the hypervisor's ability to separate the physical resources and distribute them appropriately. Each virtual function (VF) is associated with the device's PF. A given VF shares one or more physical resources of the device, such as memory, network port(s), etc., with the PF and other VFs on the device. Each VF is associated with a child partition of the hypervisor in the virtualized environment.

SR-IOV enables network traffic to bypass a software switch layer of a virtualization stack of the hypervisor. Because a VF is assigned to a child partition, network traffic may flow directly between the VF and child partition. As a result, an input/output (I/O) overhead in a software emulation layer is diminished and achieves network performance that is nearly the same performance as in a non-virtualized environment. For example, an operating system (OS) may have access to multiple VFs, e.g., for a NIC. To improve performance, the OS may delegate ownership of a VF to a user-space application, and allow that application to directly interact with physical hardware resources through that VF. In this case, the application performance can be much higher, since the application can interact directly with the hardware without the overhead of communication through the OS. SR-IOV allows the OS to delegate partial access to the hardware to an application while the rest of the hardware can be accessed directly by the OS, and/or be delegated to other applications.

A scheduler that supports scheduling of work to a VM, application, PF, or VF within the virtualized environment, supports hardware virtualization, and may be referred to as a "virtualized" scheduler. The work that is scheduled may include, for example, a packet processing operation(s) to be performed on a packet or a portion thereof. The packet may have been received, for example, from the NIC or other device via a hardware interface, such as a PCIe hardware interface, or any other hardware interface.

SUMMARY

According to an example embodiment, a system queues work within a virtualized scheduler based on in-unit accounting (IUA) of in-unit entries (IUEs). The system comprises an IUA resource and arbiter. The IUA resource is configured to store, in association with an IUA identifier, an IUA count and IUA threshold. The IUA count represents a global count of work-queue entries (WQEs) that are associated with the IUA identifier and occupy respective IUEs of an in-unit entry (IUE) resource. The IUA threshold is set to limit the global count. The arbiter is configured to retrieve the IUA count and IUA threshold from the IUA resource, based on the IUA identifier, and to control, as a function of the IUA count and IUA threshold retrieved, whether a given work-queue entry (WQE) from a given scheduling group, assigned to the IUA identifier, is moved into the IUE resource to be queued for scheduling by the virtualized scheduler.

A plurality of scheduling groups may be assigned to the IUA identifier, wherein the plurality of scheduling groups includes the given scheduling group.

The IUA identifier may correspond to a virtual machine, an application, or a physical function (PF) or virtual function (VF) associated with a single root I/O virtualization (SR-IOV) interface.

The virtualized scheduler may include a work scheduler configured to access the IUE resource. The arbiter may be further configured to move the given WQE from a given per-group transitory admission queue (TAQ) into a given per-group in-unit admission queue (IAQ) in the IUE resource to be queued for scheduling by the work scheduler. The given per-group TAQ and the given per-group IAQ are assigned to the given scheduling group.

The system may further comprise a TAQ resource. The TAQ resource includes the given per-group TAQ that is configured to queue WQEs received for the given scheduling group. The IUE resource includes a plurality of IUEs. In an event the arbiter determines that the given WQE is to be moved into the IUE resource, the arbiter is further configured to (i) allocate a free IUE of the plurality of IUEs, the free IUE to be used as a given IUE for admitting the given WQE into the IUE resource, (ii) move the given WQE from the given per-group TAQ to the given IUE, (iii) add the given IUE to a given per-group in-unit admission queue (IAQ) for the given scheduling group or associate the given IUE with the given scheduling group to create the given per-group IAQ for the given scheduling group, and (iv) cause the IUA count in the IUA resource to be updated. To cause the IUA count to be updated, the arbiter may be further configured to cause the IUA count to be incremented.

Moving the given WQE to occupy the given IUE enables the given WQE to be available for scheduling by a work scheduler of the virtualized scheduler. In an event the work scheduler determines that the given WQE is to be scheduled, the work scheduler is configured to assign the given WQE to a given workslot of a plurality of workslots.

In an event the given WQE is assigned to the given workslot, and work associated with the given WQE is completed, the work scheduler may be further configured to free the given IUE for reuse and either the work scheduler, or the arbiter, may be further configured to cause the IUA count in the IUA resource to be decremented.

The IUA threshold may be a maximum value for the IUA count and may represent a maximum number of IUEs in the IUE resource that are permitted to be occupied by respective WQEs from among all scheduling groups assigned to the IUA identifier.

The global count of WQEs may be a total number of all admitted, conflicted, scheduled, and descheduled WQEs that are associated with the IUA identifier and occupy respective IUEs of the plurality of IUEs.

To control whether the given WQE is moved, the arbiter may be further configured to implement an IUA test and, based on a positive result for the IUA test implemented, further configured to move the given WQE from a given per-group transitory admission queue (TAQ), assigned to the given scheduling group, and into the IUE resource. The positive result may be based on determining that the IUA count is less than the IUA threshold.

The positive result may be further based on determining that a free count is greater than zero. The free count may be a total number of unoccupied IUEs of a plurality of available IUEs of the plurality of IUEs, wherein the plurality of available IUEs are available to the arbiter for moving WQEs into the IUE resource for queueing. At least one IUE, of the plurality of IUEs, may be reserved. The plurality of available IUEs may exclude the at least one IUE reserved.

The positive result may be further based on determining that a group count is less than or equal to a group reserved threshold. The group count may be a total number of IUEs, of the plurality of IUEs, that are occupied by respective WQEs that belong to the given scheduling group and have never been scheduled by the work scheduler. The group reserved threshold may be a given number of reserved IUEs, of the plurality of IUEs, that are reserved for the given scheduling group for occupancy by WQEs that belong to the given scheduling group and have never been scheduled by the work scheduler.

A first portion of IUEs, of the plurality of IUEs, may be arranged to form a given per-group in-unit admission queue (IAQ) in the IUE resource for the given scheduling group. The given per-group IAQ may be created by the arbiter by allocating free IUEs of the plurality of IUEs and moving WQEs belonging to the given scheduling group into the free IUEs allocated. A second portion of IUEs, of the plurality of IUEs, may be arranged to form a given per-group conflict queue in the IUE resource for the given scheduling group. The second portion of IUEs is occupied by respective WQEs that were moved by the work scheduler, from the given per-group IAQ to the given per-group conflict queue, in response to respective attempts to schedule the respective WQEs. The respective attempts failed due to respective scheduling conflicts. As such, WQEs occupying respective IUEs of the given per-group IAQ and given per-group conflict queue represent the respective WQEs that belong to the given scheduling group and have never been scheduled by the work scheduler.

The arbiter may be further configured to increment the group count in an event the given WQE is moved into the IUE resource. In an event the given WQE is scheduled by the work scheduler and work associated with the given WQE is completed, either the arbiter or the work scheduler may be configured to decrement the group count.

The positive result may be further based on determining that a) the free count is greater than a reserved free count, wherein the reserved free count is counted as part of the free count, and b) a group count is less than a group maximum threshold.

The reserved free count may be a total number of unoccupied reserved IUEs from among reserved IUEs, of the plurality of IUEs, that are reserved for moving WQEs of respective scheduling groups into the IUE resource. The group count may be a total number of IUEs, of the plurality of IUEs, that are occupied by respective WQEs that belong to the given scheduling group and have never been scheduled by the work scheduler. The group maximum threshold may be a maximum number of IUEs, of the plurality of IUEs, that are permitted to be occupied by WQEs that are from the given scheduling group and that have never been scheduled by the work scheduler.

The IUE resource may include a given per-group IAQ for the given scheduling group and a given per-group conflict queue for the given scheduling group. The WQEs that are from the given scheduling group and that have never been scheduled may occupy respective IUEs of: the given per-group IAQ, given per-group conflict queue, or a combination thereof The positive result may be further based on determining that a group count is less than or equal to a group reserved threshold or that a) the free count is greater than a reserved free count, wherein the reserved free count is counted as part of the free count, and b) a group count is less than a group maximum threshold.

In an event the IUA count is greater than or equal to the IUA threshold, the arbiter may be further configured to disregard the given WQE from consideration for movement into the IUE resource.

The IUA resource may include a lookup table configured to store a plurality of respective IUA count and IUA threshold pairings each associated with a respective IUA identifier.

The given WQE may include an identifying pointer, a tag value, a tag-type, and a group identifier. The tag value associates the given WQE with a unique work-flow. The tag-type specifies whether the unique work-flow is ordered, atomic, or un-ordered. The group identifier corresponds to the given scheduling group.

According to another example embodiment, a method for queuing work within a virtualized scheduler is based on in-unit accounting (IUA) of in-unit entries (IUEs). The method comprises retrieving an IUA count and IUA threshold from an IUA resource based on an IUA identifier. The IUA count represents a global count of work-queue entries (WQEs) that are associated with the IUA identifier and occupy respective IUEs of a plurality of IUEs of an in-unit entry (IUE) resource. The IUA threshold is set to limit the global count. The method further comprises controlling, as a function of the IUA count and IUA threshold retrieved from the IUA resource based on the IUA identifier, whether a given work-queue entry (WQE) from a given scheduling group, assigned to the IUA identifier, is moved into the IUE resource to be queued for scheduling by the virtualized scheduler.

Alternative method embodiments parallel those described above in connection with the example system embodiment.

According to another example embodiment, a virtualized scheduler comprises an in-unit accounting (IUA) resource configured to store, in association with an IUA identifier, an IUA count and IUA threshold. The IUA count represents a global count of work-queue entries (WQEs) that are associated with the IUA identifier and occupy respective in-unit entries (IUEs) of an in-unit entry (IUE) resource. The IUA threshold is set to limit the global count. The virtualized scheduler further comprises a work scheduler configured to schedule WQEs occupying respective IUEs in the IUE resource to respective workslots for processing by respective work processing entities assigned to the respective workslots. The virtualized scheduler further comprises an arbiter configured to retrieve the IUA count and IUA threshold from the IUA resource, based on the IUA identifier, and to control, as a function of the IUA count and IUA threshold retrieved, whether a given work-queue entry (WQE) from a given scheduling group, assigned to the IUA identifier, is moved into the IUE resource to be queued for scheduling by the work scheduler.

According to another example embodiment, a network services processor comprises a plurality of processor cores and a virtualized scheduler. The virtualized scheduler includes an in-unit accounting (IUA) resource. The IUA resource is configured to store, in association with an IUA identifier, an IUA count and IUA threshold. The IUA count represents a global count of work-queue entries (WQEs) that are associated with the IUA identifier and occupy respective IUEs of an in-unit entry (IUE) resource. The IUA threshold is set to limit the global count. The virtualized scheduler further includes an arbiter configured to retrieve the IUA count and IUA threshold from the IUA resource, based on the IUA identifier, and to control, as a function of the IUA count and IUA threshold retrieved, whether a given workqueue entry (WQE) from a given scheduling group, assigned to the IUA identifier, is moved into the IUE resource to be queued for scheduling by the virtualized scheduler for processing by a given processor core of the plurality of processor cores or a given thread executing on the given processor core.

According to yet another example embodiment, an interface unit comprises a network interface and a work-queue entry (WQE) generator. The WQE generator is configured to generate a given WQE associated with packet data received by the network interface. The given WQE belongs to a given scheduling group. The given scheduling group is assigned to an in-unit accounting (IUA) identifier associated with an IUA count and IUA threshold. The interface unit is communicatively coupled to a virtualized scheduler. The at least one WQE generator is further configured to transmit the given WQE to the virtualized scheduler to be queued for scheduling based on the IUA count and IUA threshold.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
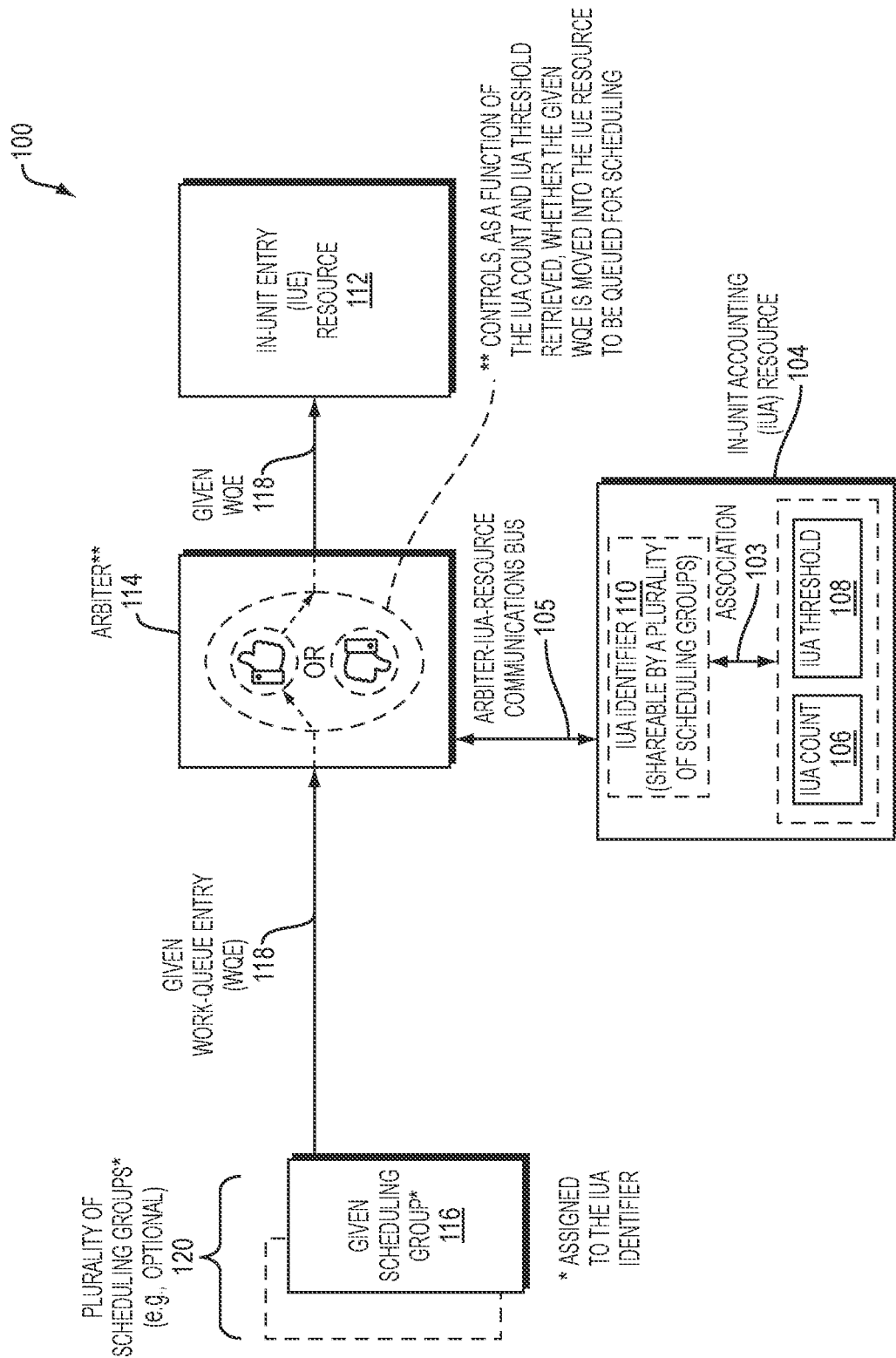
FIG. 1A is a block diagram of an example embodiment of a system for queuing work within a virtualized scheduler based on in-unit accounting (IUA) of in-unit entries (IUEs).

A description of example embodiments follows.

Modern systems use virtualized schedulers, that is, schedulers that support hardware virtualization within which groups of pieces of work, for example, packet processing functions, can be assigned to different peripheral component interconnect express (PCIe) single root I/O virtualization (SR-IOV) physical functions (PFs) and virtual functions (VFs). Each physical function (PF) or virtual function (VF) may be assigned one or more work groups (also referred to interchangeably herein as scheduling groups) that include a respective collection of pieces of work to be performed.

Generally, "work" is a software routine or handler to be performed on some data, such as packet data. To the virtualized scheduler, work may be represented by an opaque pointer to memory, that is, a pointer which points to a data structure whose contents are not exposed at a time of its definition. Such a pointer may be initially created by a network interface unit (NIX), such as the NIX 671 of FIG. 6B, disclosed further below, or by software, and may be referred to herein as a work-queue pointer (WQP). The WQP, in combination with a group identifier, tag type, and tag, may collectively form an entry, referred to herein as a work-queue entry (WQE), such as the WQE of FIG. 5, disclosed further below.

According to an example embodiment, before work can be scheduled by a virtualized scheduler for processing by, e.g., a processor core, processor thread, or other work processing entity, the WQE needs to be moved into an in-unit entry (IUE) of an IUE resource of the virtualized scheduler, such as the IUE resource 112 of the virtualized scheduler 102 of FIG. 1B, disclosed further below. The IUE resource and its corresponding in-unit entries (IUEs) are referred to herein as being "in-unit" because the IUE resource and IUEs are included within the virtualized scheduler that may be referred to as a scheduler "unit." Such IUEs may reside in on-chip memory of a chip, such as in a content-addressable memory (CAM), static random-access memory (SRAM), or other type of on-chip memory of the chip.

The chip may be a network services processor, such as the network services processor 650 of FIG. 6A, disclosed further below. The virtualized scheduler may be the Schedule/Sync and Order (SSO) module 602 of the network services processor 650, disclosed further below, and may use a work scheduler, such as the work scheduler 148 of FIG. 1B, in order to schedule work to a workslot that is assigned to a processor core, such as a processor core of the processor cores 640*a-k* of FIG. 6A, processing thread, or other work processing entity. The work is identified by work-queue entries (WQEs) that occupy respective IUEs of the IUE resource in order to be scheduled, for example, via assignment to a workslot by the work scheduler.

The plurality of IUEs in the IUE resource are a limited resource. When different combinations of groups of WQEs (also referred to interchangeably herein as scheduling groups) are assigned, for example, to different SR-IOV functions, such as different PFs, VFs, or a combination thereof, it is useful to limit how many IUEs are available to each SR-IOV function in order to prevent any given PF(s) or VF(s) from using an excessive number of IUEs and potentially starving other PF(s) or VF(s). According to an example embodiment, a given SR-IOV function, such as a PF or VF, may be assigned a given in-unit accounting (IUA) identifier, such as the IUA identifier 110 of FIG. 1A, disclosed further below, and all work group(s) assigned to that given SR-IOV is/are assigned the given IUA identifier of the SR-IOV function.

As such, each scheduling group is assigned to an IUA identifier. The IUA identifier may be an indicator that enables a given location(s) in memory/memories to be accessed to read or write IUA information. For example, the IUA identifier may be an index that corresponds to an entry or entries in a table(s) of entries. Such an index may be an integer, memory address, offset to a memory address, pointer, or any other element that enables a given location(s) in memory/memories to be accessed. According to an example embodiment, the IUA identifier may be a character or string. For example, the IUA identifier may be a label that is associated with a given location(s) in memory/memories. According to an example embodiment, the IUA identifier may include or identify a plurality of IUA identifiers.

The IUA identifier may be assigned by firmware or a physical function driver during initialization. For example, firmware may be configured to assign an IUA identifier for each PF/VF, and all work groups (i.e., scheduling groups) assigned to the same PF/VF will use the same IUA identifier (i.e., they share resources), whereas work groups assigned to different PF/VFs may use different IUA identifiers to separate their resources. According to an example embodiment, the virtualized scheduler includes a system with an IUA resource that may be configured to store a maximum threshold for each IUA identifier and each work group (i.e., scheduling group) may also be configured with its own reserve threshold, as disclosed further below. According to an example embodiment, the virtualized scheduler may include a system with an arbiter, such as the arbiter 114 of the system 100 of FIG. 1A, disclosed below, that may be configured to determine when work items, that is, WQEs, can be moved into the IUE resource 112 based on information included in the IUA resource 104.

FIG. 1A is a block diagram of an example embodiment of a system 100 for queuing work within a virtualized scheduler, such as the virtualized scheduler 102 of FIG. 1B and the Schedule/Sync and Order (SSO) module 602 of FIG. 6A, disclosed further below. The system 100 is configured to queue work based on in-unit accounting (IUA) of in-unit entries (IUEs) (not shown). The system 100 comprises an IUA resource 104 configured to store, in association 103 with an IUA identifier 110, an IUA count 106 (also referred to interchangeably herein as "IUA_CNT") and IUA threshold 108 (also referred to interchangeably herein as "IUA_THRESH"). According to an example embodiment, the IUA resource 104 may include a lookup table (not shown) that is configured to store a plurality of respective IUA count and IUA threshold pairings each associated with a respective IUA identifier. It should be understood, however, that the plurality of respective IUA count and IUA threshold pairings are not limited to being stored in a lookup table.

The IUA count 106 represents a global count (not shown) of work-queue entries (WQEs) (not shown) that are associated with the IUA identifier 110 and occupy respective IUEs (not shown) of an IUE resource 112. The IUA count 106 is "global" because it represents an overall, general, count of IUEs associated with the IUA identifier 110 and is not limited, for example, to a count of WQEs that are associated with the IUA identifier 110 and stored in a single particular queue or single particular type of queue. For example, counts of WQEs associated with the IUA identifier 110 and occupying IUEs of the given per-group in-unit admission queue (IAQ) 134 of FIG. 1B. disclosed further below, would be an example of a "local" count, as such a count is local to that particular per-group IAQ, that is, the given per-group IAQ 134.

Continuing with reference to FIG. 1A, the IUA threshold 108 is set to limit the global count. The IUA threshold 108 may be set, for example, by firmware, or may be initialized by hardware. It should be understood, however, that the IUA threshold 108 is not limited to being set by firmware or hardware. The IUA threshold 108 may be a maximum value for the IUA count 106 and may represent a maximum number of IUEs in the IUE resource 112 that are permitted to be occupied by respective WQEs from among all scheduling groups (not shown) that are assigned to the IUA identifier 110. The system 100 further comprises an arbiter 114 configured to retrieve the IUA count 106 and IUA threshold 108 from the IUA resource 104, based on the IUA identifier 110, and to control, as a function of the IUA count 106 and IUA threshold 108 retrieved, whether a given work-queue entry (WQE) 118 from a given scheduling group 116, assigned to the IUA identifier 110, is moved into the IUE resource 112 to be queued for scheduling by the virtualized scheduler.

The arbiter 114 may be configured to retrieve the IUA count 106 and IUA threshold 108 based on the IUA identifier 110. For example, according to an example embodiment, the arbiter 114 may be communicatively coupled to the IUA resource 104 via an arbiter-IUA-resource communications bus 105. The arbiter 114 may be configured to employ the arbiter-IUA-resource communications bus 105 to read a memory location (not shown) that is located in the IUA resource 104, wherein the IUA count 106 and IUA threshold 108 are stored at that memory location. The memory location may be addressed based on the IUA identifier 110. According to an example embodiment, the arbiter 114 may employ the arbiter-IUA-resource communications bus 105 to access the IUA resource 104 in order to obtain the IUA identifier 110 based on a group identifier (not shown) that is included in the given WQE 118.

For example, the IUA resource 104 may include an IUA assignment table (not shown), such as disclosed further below with regard to FIG. 4, that includes a mapping between the group identifier and the IUA identifier 110. As such, the arbiter 114 may be further configured to retrieve the IUA identifier 110 from the IUA resource 104 based on the group identifier, enabling the arbiter 114 to retrieve the IUA count 106 and IUA threshold 108 from the IUA resource 104 based on the IUA identifier 110.

According to an example embodiment, the arbiter 114 may include an IUA resource controller (not shown) that is configured to access the IUA resource 104 over the arbiter-IUA-resource communications bus 105 to retrieve the IUA count 106 and IUA threshold 108 based on the IUA identifier 110. For example, the IUA resource controller may be configured to retrieve the IUA identifier 110 from the IUA resource 104 based on the group identifier of the WQE 118 and to retrieve the IUA count 106 and IUA threshold 108 from the IUA resource 104 based on the IUA identifier 110. The IUA resource controller may be further configured to update the IUA count 106 associated with the IUA identifier 110 based on the group identifier and a command received from the arbiter 114. For example, the command may instruct the IUE resource controller to increment or decrement the IUA count 106 and may include the group identifier. The IUA resource controller may be configured to use the group identifier to retrieve the IUA identifier 110 in order to address the memory location at which the IUA count 106 is stored in the IUA resource 104 and update (e.g., increment or decrement) the IUA count 106. According to an example embodiment, the IUA resource controller may be included in the arbiter 114, external to the arbiter 114 and used exclusively by the arbiter 114, or may be external to the arbiter 114 and shared by the arbiter 114 and a work scheduler, such as disclosed further below with regard to FIG. 1B.

Continuing with reference to FIG. 1A, according to an example embodiment, a plurality of scheduling groups 120 may be assigned to the IUA identifier 110. The plurality of scheduling groups 120 includes the given scheduling group 116. The IUA identifier 110 may correspond to a virtual machine (not shown), an application (not shown), or a physical function (PF) (not shown) or virtual function (VF) (not shown) associated with a single root I/O virtualization (SR-IOV) interface (not shown). As such, the IUA identifier 110 may be shareable amongst the plurality of scheduling groups 120 that include work for scheduling by the virtualized scheduler, such as the virtualized scheduler of FIG. 1B, disclosed below.

Figure 1B:
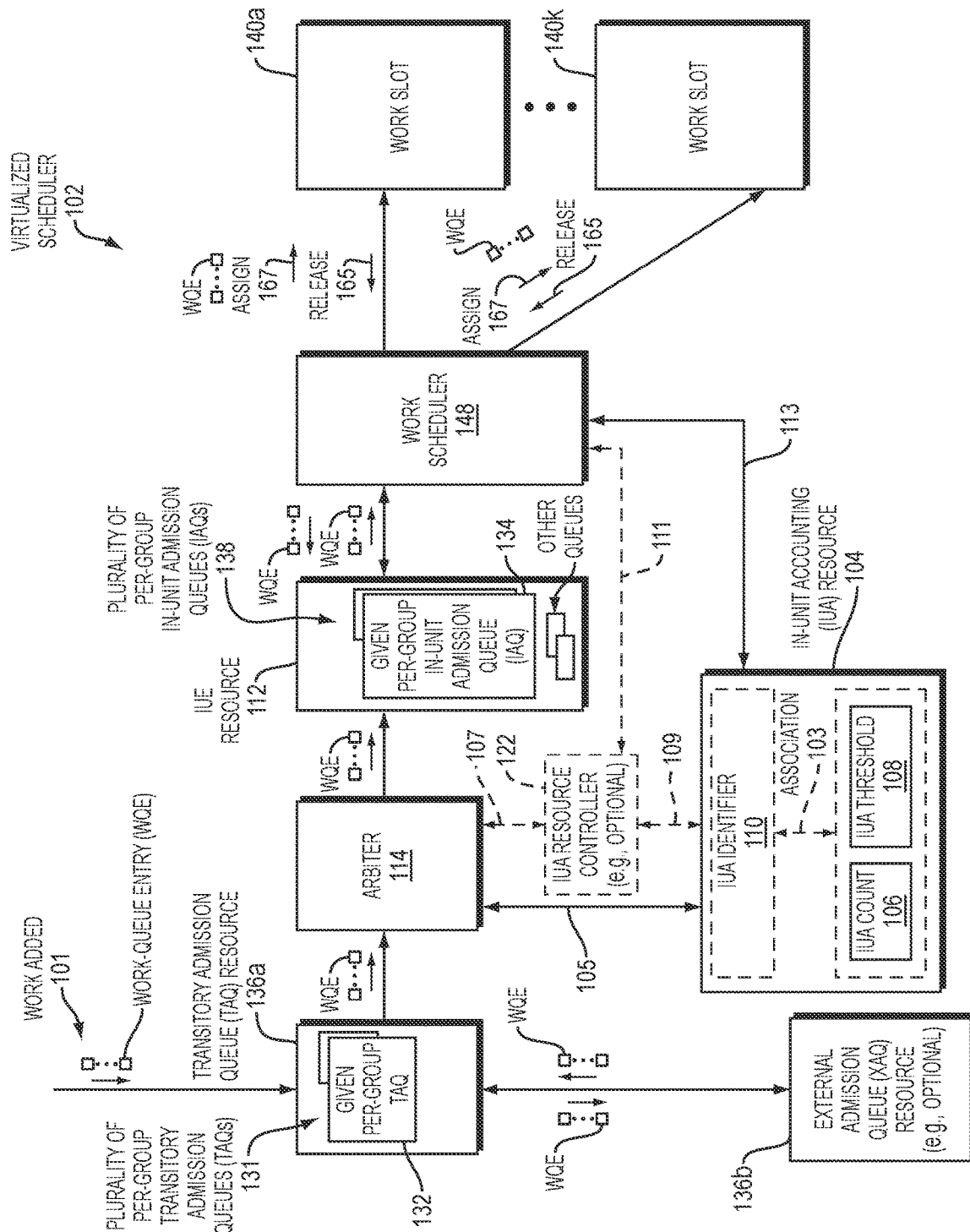
FIG. 1B is a block diagram of an example embodiment of a virtualized scheduler.

FIG. 1B is a block diagram of an example embodiment of a virtualized scheduler 102 that includes elements of the system 100 of FIG. 1A, disclosed above. The virtualized scheduler 102 may be referred to interchangeably herein as a Schedule/Sync and Order (SSO) module, or simply, an SSO, and may be employed as the SSO module 602 of the network services processor 650, disclosed further below with regard to FIG. 6A and FIG. 6B.

Continuing with reference to FIG. 1B, when work is added 101 to the virtualized scheduler 102, it enters an "admission queue" assigned to a group associated with the work. Each group has a dedicated admission queue (not shown) that is split between a transitory admission queue (TAQ) and an in-unit admission queue (IAQ), as disclosed below with regard to FIG. 1C.

Figure 1C:
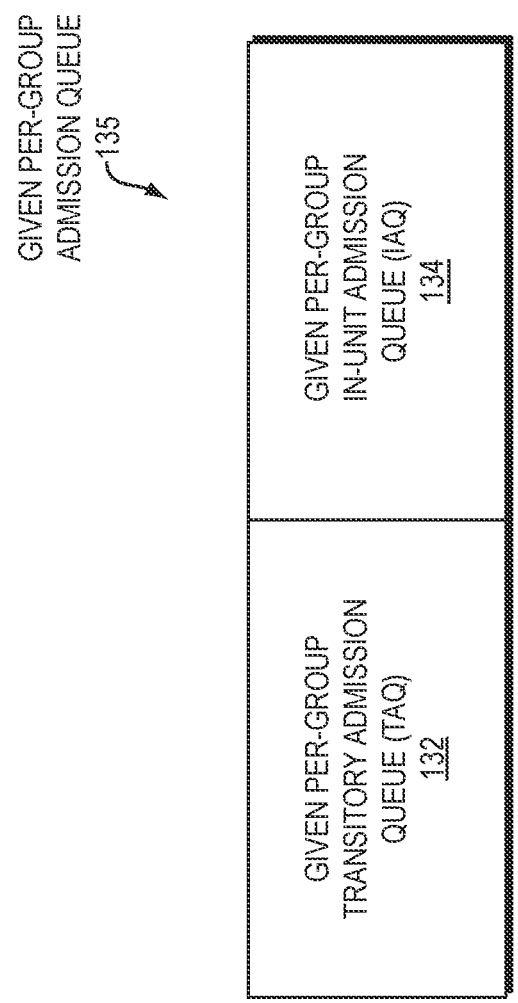
FIG. 1C is a block diagram of an example embodiment of an admission queue.

FIG. 1C is a block diagram of an example embodiment of a given per-group admission queue 135. The given per-group admission queue 135 is dedicated to a given scheduling group, such as the given scheduling group 116 of FIG. 1A, disclosed above, and is split between a given per-group TAQ 132 and given per-group IAQ 134, disclosed in more detail below with regard to FIG. 1B.

Referring back to FIG. 1B, the virtualized scheduler 102 includes a TAQ resource 136a that includes a plurality of per-group TAQs 131. The plurality of per-group TAQs 131 includes the given per-group TAQ 132 of the given per-group admission queue 135 of FIG. 1C, disclosed above. The virtualized scheduler 102 further includes the IUE resource 112 that includes a plurality of per-group in-unit admission queues (IAQs) 138. The plurality of per-group IAQs 138 includes the given per-group IAQ 134 of the given per-group admission queue 135 of FIG. 1C, disclosed above.

It should be understood that respective lengths of per-group TAQs of the plurality of per-group TAQs 131 may be dynamic. For example, a respective per-group TAQ may not exist until work for a respective scheduling group is added to the TAQ resource 136a and, thus, may have a respective length of zero. As WQEs are added to the respective per-group TAQ, its length increases, and as WQEs are removed, its length decreases.

Similarly, each per-group IAQ of the plurality of per-group IAQs 138 may have a dynamic length and may not exist until work (i.e., WQE) for a respective scheduling group has been moved from the TAQ resource 136a into the IUE resource 112 by the arbiter 114. For example, the given per-group IAQ 134 may not exist until the arbiter 114 allocates a free IUE (not shown), from a plurality of IUEs (not shown) of the IUE resource 112, for use as a given IUE configured to store a given WQE that is moved from the TAQ resource 136a into the IUE resource 112 by the arbiter 114. The arbiter 114 associates the given IUE with a given scheduling group (not shown) to which the given WQE belongs and the given IUE transitions from a free state to an occupied state and represents an IAQ entry (not shown) of the given per-group IAQ 134 that is then dedicated to storing WQEs of the scheduling group. For example, as additional WQEs of the given scheduling group 116 are added to the IUE resource 112, they are configured to occupy respective free IUEs that are then appended to the given per-group IAQ 134.

According to an example embodiment, the arbiter 114 may select the free IUA, to be occupied by a respective WQE, based on an IUE free list (not shown) that is maintained to identify free IUEs (not shown) in the IUE resource 112. The IUE free list may reside, for example, in the arbiter 114 and may be maintained by the arbiter 114. It should be understood, however, that the IUE free list is not limited to being located in the arbiter 114 or to being maintained by the arbiter 114. Maintaining the IUE free list may include changing an IUE free list pointer from pointing to the given IUE, that becomes occupied, to point to a next free IUE (not shown) in the IUE resource 112.

The next free IUE may or may not be adjacent to the given IUE in the IUE resource 112. As WQEs for the given scheduling group are moved from the TAQ resource 136a to the IUE resource 112, the given per-group IAQ 134 may increase in length as IUEs become occupied by those WQEs and are added to the given per-group IAQ 134. The arbiter 114 may add an IUE to the given per-group IAQ 134 by linking the IUE to another IUE of the given per-group IAQ 134 to form a queue that has an order, wherein such order tracks an admission order of admission to the IUE resource 112 of respective WQEs occupying same.

According to an example embodiment, the plurality of per-group TAQs 131 may be linked lists or doubly linked lists. Similarly, the plurality of per-group IAQs 138 may be linked lists or doubly linked lists. According to an example embodiment, the plurality of per-group TAQs and per-group IAQs 138 may operate on a first-in first-out (FIFO) basis.

In general, work is moved from the TAQ resource 136a to the IUE resource 112 by the arbiter 114 and as work moves through the TAQ resource 136a and into the IUE resource 112, it remains ordered within each group. Initially, work is added 101 to the TAQ resource 136a. Such work may be generated and added 101, for example, by one or more of: the network interface unit (NIX) 671, cryptographic accelerator unit (CPT) 678, or timer unit 649 of FIG. 6B, disclosed further below, or a processor core, such as a processor core of the processor cores 640a-k of FIG. 6A and FIG. 6B, disclosed further below. It should be understood, however, that work may be generated and added 101 by other elements and is not limited to being generated and added by the network interface unit (NIX) 671, cryptographic accelerator unit (CPT) 678, or timer unit 649 of FIG. 6B.

Continuing with reference to FIG. 1B, the TAQ resource 136a may reside in on-chip memory and may be extended in size based on an external admission queue (XAQ) resource 136b that resides, for example, in off-chip memory. According to an example embodiment, the on-chip memory may include SRAM and the off-chip memory may include dynamic-random access memory (DRAM), such as the DRAM 608 of FIG. 6A, disclosed further below. As more work is added 101 and the on-chip SRAM fills, the virtualized scheduler 102 moves work from the on-chip portion of the TAQ resource 136a into the off-chip memory of the XAQ resource 136b. The virtualized scheduler 102 can later bring that work back on-chip, that is, back into the TAQ resource 136a, in an event resources in the TAQ resource 136a become available.

Before work can be scheduled, it is moved from the given per-group TAQ 132 of the TAQ resource 136a and into a given per-group IAQ 134 of the IUE resource 112. The IUE resource 112 comprises a portion of the on-chip SRAM memories from which work can be scheduled to the workslots 140a-k. Each workslot of the workslots 140a-k represents state of respective work for completion by a respective work processing entity that is assigned to the workslot. The respective work processing entity may be a processor core, such as a given processor core of the plurality of processor cores 640a-k of FIG. 6A, disclosed further below. Alternatively, the work processing entity may be a given processor thread that is executing on the given processor core, wherein the given processor thread is assigned to the workslot. The respective work processing entity may request work, causing the work scheduler 148 to schedule work for the respective workslot assigned to the respective work processing entity.

Continuing with reference to FIG. 1B, the IUE resource 112 may further store data to track active work, that is, WQEs in the IUE resource 112, until it has been completed and released from the virtualized scheduler 102. The IUE resource 112 is a limited resource which is shared by all groups (also referred to interchangeably herein as scheduling groups or work groups).

Each group (i.e., scheduling group) has its own reserve threshold for a minimum amount of work it can place in its respective per-group IAQ—this guarantees that a group can always schedule work at a given rate according to its priority. Each group also has a maximum threshold to prevent it from utilizing more than an allotted share of IUEs of the IUE resource 112. WQEs occupying respective IUEs of the IUE resource 112 may be assigned to workslots by a work scheduler 148 of the virtualized scheduler 102, causing such WQEs to become "scheduled" for processing by a work processing entity assigned to the corresponding workslot.

Referring to FIGS. 1A-D, the virtualized scheduler 102 includes the work scheduler 148 that is configured to access the IUE resource 112. The arbiter 114 may be further configured to move the given WQE 118 from the given per-group TAQ 132 into the given per-group IAQ 134 in the IUE resource 112 to be queued for scheduling by the work scheduler 148. The given per-group TAQ 132 and the given per-group IAQ 134 are assigned to the given scheduling group 116.

The given per-group TAQ 132 is configured to queue WQEs received for the given scheduling group 116. The IUE resource 112 includes a plurality of IUEs (not shown).

In an event the arbiter 114 determines that the given WQE 118 is to be moved into the IUE resource 112, the arbiter 114 may be further configured to (i) allocate a free IUE (not shown) of the plurality of IUEs (not shown), the free IUE to be used as a given IUE (not shown) for admitting the given WQE 118 into the IUE resource 112, (ii) move the given WQE 118 from the given per-group TAQ 132 to the given IUE, (iii) add the given IUE to the given per-group IAQ 134 for the given scheduling group 116 or associate the given IUE with the given scheduling group 116 to create the given per-group IAQ 134 for the given scheduling group 116, and (iv) cause the IUA count 106 in the IUA resource 104 to be updated. To cause the IUA count 106 to be updated, the arbiter 114 may be further configured to cause the IUA count 106 to be incremented.

The arbiter 114 may cause the IUA count 106 to be updated in a number of ways. For example, the arbiter 114 may access the IUA count 106 in the IUA resource 104 by reading and writing the IUA count 106 via the arbiter-IUA-resource communications bus 105. In such a case, the arbiter 114 may first retrieve the IUA identifier 110 from the IUA resource 104 based on a group identifier (not shown) included in the WQE 118. For example, the arbiter 114 may retrieve the IUA identifier 110 that is mapped to the group identifier in a table (not shown) that is located in the IUA resource 104. The arbiter 114 may then, in turn, use the IUA identifier 110 to retrieve the IUA count 106, update the IUA count 106, and write the updated version of the IUA count 106 back to the IUA resource 104 at a location that is based on the IUA identifier 110.

Alternatively, the arbiter 114 may send a command (not shown) to an IUA resource controller 122 to update the IUA count 106. For example, the arbiter 114 may send the group identifier from the given WQE 118 to the IUA resource controller 122 along with a command (not shown) to, for example, increment the IUA count 106. The group identifier and command may be sent from the arbiter 114 to the IUA resource controller 122 over an arbiter-IUA-resource -controller communications bus 107. The group identifier and command may be sent in any suitable way, for example, the group identifier may be a field of the command.

Responsive to the command, the IUA resource controller 122 may access the IUA resource 104 via an IUA-resource-controller-IUA-resource communications bus 109 in order to retrieve the IUA identifier 110 based on the group identifier. The IUA resource controller 122 may then, in turn, update the IUA count 106 by reading the IUA count 106 from a memory location that is based on the IUA identifier 110 and writing an updated value for the IUA count 106 to the memory location.

When determining whether the given scheduling group 116 may move work from the TAQ resource 136a to the IUE resource 112, the arbiter 114 may retrieve IUA tracking information (not shown) that may be stored in the IUA resource 104. Such IUA tracking information may be read and/or written by the arbiter 114 directly, via the arbiter-IUA-resource communications bus 105 or indirectly, by sending command(s) to the IUA controller 122, disclosed above. The arbiter 114 may retrieve such tracking information to implement an IUA test based on the IUA tracking information to determine whether the given WQE 118 from the given scheduling group 116 can be moved from the given per-group TAQ 132 of the TAQ resource 136a to the given per-group IAQ 134 of the IUE resource 112.

To implement the IUA test, the arbiter 114 may access the IUA resource 104 to look up (i.e., retrieve) the IUA identifier 110 using the group identifier that is unique to the given scheduling group 116. The arbiter 114 may use the IUA identifier 110 to retrieve the IUA tracking information from the IUA resource 104, wherein the tracking information may include the following: GRP_CNT, RSVD_THR, MAX_THR, IUA_CNT, IUA_THRESH, and FREE_CNT, disclosed further below. Alternatively, the arbiter 114 may send the group identifier of the given WQE 118 with an IUA test command (not shown) to the IUA resource controller 122 and the IUA resource controller 122 may retrieve the IUA tracking information for returning to the arbiter 114 or to implement the IUA test for the arbiter 114 and return a result of the IUA test to the arbiter 114.

The arbiter 114 or IUA resource controller 122 may implement the following IUA test using the tracking information to determine whether the given WQE 118 work from the given scheduling group 116 is permitted to be moved from the given per-group TAQ 132 to the given per-group IAQ 134:

IUA result=(FREE_CNT>0

&& (IUA_CNT<IUA_THRESH)

&& (GRP_CNT<=RSVD_THR

||(FREE_CNT>RSVD_FREE &&
    GRP_CNT<MAX_THR)) (1)

In an event the IUA result reflects that expression (1), disclosed above, that is, the "IUA test," evaluates to true, the IUA result is determined to be a positive result and the given WQE 118 is moved by the arbiter 114 from the given per-group TAQ 132 to the given per-group IAQ 134 dedicated to the given scheduling group 116.

If, however, expression (1) evaluates to false, the arbiter 114 bypasses WQEs of the given scheduling group 116 that are present in the TAQ resource 136a, that is, present in the given per-group TAQ 132, and checks whether another scheduling group is permitted have its WQEs moved to the IUE resource 112, based on the IUA result of expression (1) for that scheduling group. The arbiter 114 may be configured to perform, or may instruct the IUA resource controller 122 to perform, the above-disclosed IUA test for each scheduling group of a plurality of scheduling groups in a round-robin fashion or based on respective priorities assigned to scheduling groups of the plurality of scheduling groups. The IUA test, disclosed above, may be implemented by the arbiter 114 or IUA resource controller 122 to prevent scheduling groups from using more than their allocated amount of space in the IUE resource 112. In an event the IUA test is implemented by the IUA controller 122, the IUA controller 122 is configured to return the IUA result to the arbiter 114.

Referring to expression (1) above, the GRP_CNT may be a total number of IUEs (i.e., resources in the scheduler "unit") occupied by work-queue entries (WQEs, aka "work") belonging to a given scheduling group wherein that work has never been scheduled. That is, the work has never been assigned to a given workslot of a plurality of workslots 140a-k. This may include all work in the given per-group IAQ 134, and, optionally, all work in a "conflict queue" (CQ), such as the given per-group conflicted queue 147 of FIG. 1D, disclosed further below, because conflicted work has also never been scheduled. This GRP_CNT may be incremented when work is first added to the IUE resource (in the per-group IAQ 134), and decremented when work gets scheduled (i.e., assigned to a workslot). Such incrementing or decrementing of the GRP_CNT may be performed by the arbiter 114 or the IUA resource controller 122. For example, the IUA resource controller 122 may perform such incrementing or decrementing based on a command received from the arbiter 114 to update the GRP_CNT for the given scheduling group 116.

The RSVD_THR is a group IAQ reserve threshold and may be a number of IUEs reserved for the given scheduling group 116. In general, the virtualized scheduler 102 may guarantee that this many IUEs are always available for the purpose of queuing WQEs in the given per-group IAQ 134 and given per-group CQ 147 (disclosed below with regard to FIG. 1D) belonging to the given scheduling group 116. These entries are used first, when adding work to the given per-group IAQ 134. That is, the in-unit accounting may be such that these "reserved" entries get counted first.

The MAX_THR is a group IAQ maximum threshold that may represent a maximum number of IUEs that a group may use for work that has never been scheduled (i.e., for IAQ or CQ). The IUA identifier 110 for the given scheduling group 116 is an in-unit accounting identifier that software has programmed for the given scheduling group and determines which IUA_CNT (also referred to interchangeably herein as an "IUA count") and IUA_THRESH (also referred to interchangeably herein as an "IUA threshold") are used for the given scheduling group 116.

The IUA_CNT, that is, the IUA count 106, may be a count of work items in the IUE resource 112 for the IUA identifier 110. This count includes all WQEs, with respective group identifiers associated with the IUA identifier 110, that have been added to the IUE resource 112 of the virtualized scheduler 102 and currently occupy respective IUEs of the IUE resource 112. Specifically, this count may include work in the per-group IAQ and CQ of each scheduling group assigned to the IUA identifier 110 which has never been scheduled, as well as work that is currently scheduled, and work that was scheduled at least once but has since been "descheduled." This count may be incremented when work is first added to the IUE resource (i.e., in a per-group IAQ), and decremented when work completes and the work scheduler 148 frees the IUE, enabling the IUE to be reused. The work scheduler 148 may free the IUE in response to a release 165 indication received from a work processing entity (not shown) that is assigned to a given workslot that was assigned the work.

For example, the work scheduler 148 may assign 167 a given WQE to the given workslot and the work processing entity assigned to the given workslot may send the release 165 indication based on completion of the work represented by the given WQE. The work scheduler 148 may free the IUE by updating the free list, disclosed above, or by notifying the arbiter 114 that the IUE is to be freed, thereby causing the arbiter 114 to update the free list to indicate that the IUE is free for use.

Continuing with reference to expression (1), the IUA_THRESH, that is, the IUA threshold 108, is a maximum value for the IUA_CNT that corresponds to the IUA identifier 110. That is, the maximum number of IUEs which may be occupied by work from all groups assigned the IUA identifier 110.

A number of free (i.e., unoccupied) IAQ entries, also referred to interchangeably herein as the "FREE_CNT," is the number of IUEs which are available to the arbiter 114 when adding IAQ entries. Typically, this is the number of IUEs which are not currently in use, i.e., do not contain any valid work. In some cases, there may be some IUEs which do not contain work but which are being reserved for other purposes and which are not included in this count. For example, there may be a mechanism in addition to the arbiter 114 that enables work to be added to the IUE resource 112 without going through an IAQ, and some IUEs of the IUE resource 112 may be reserved for this mechanism.

The number of unused IAQ entries available for allocations within the reserve threshold (also referred to interchangeably herein as "RSVD_FREE") is the total number of free IUEs which can only be used when adding work to the IAQ for a group which is currently using less than its reserved threshold, i.e., where GRP_CNT<RSVD_THR. These entries are also counted as part of FREE_CNT.

In an event the arbiter 114 determines that the IUA test result is positive based on evaluation of expression (1), disclosed above, the arbiter 114 moves the given WQE 118 from the given per-group TAQ 132 to the given per-group IAQ 134 which causes the given WQE 118 to occupy a given IUE of the IUE resource 112. By occupying the given IUE, the given WQE 118 becomes available for scheduling by the work scheduler 148 of the virtualized scheduler 102.

In an event the work scheduler 148 determines that the given WQE 118 is to be scheduled, the work scheduler 148 is configured to assign 167 the given WQE 118 to a given workslot of a plurality of workslots 140a-k. The given workslot may correspond to a given processor core of a plurality of processor cores, such as the plurality of processor cores 640a-k of FIG. 6A, disclosed further below. Alternatively, the given workslot may correspond to a processing thread executing on a given processor core of the plurality of processor cores 640a-k, or any other work processing entity. In an event the given WQE 118 is assigned to the given workslot, and work associated with the given WQE 118 is completed by the work processing entity assigned to the given workslot, the work scheduler 148 may be further configured to free the given IUE for reuse and either the work scheduler 148, or the arbiter 114, may be further configured to cause the IUA count 106 in the IUA resource 104 to be decremented.

For example, the work scheduler 148 may update the free list, disclosed above, to indicate that the given IUE is free and may send a command (not shown). with the group identifier of the given WQE 118, to the IUA resource controller 122, via a work-scheduler-IUA-resource -controller communications bus 111. The IUA resource controller 122 may then, in turn, retrieve the IUA identifier 110 from the IUA resource 104 based on the group identifier and then decrement the IUA count 106 in the IUA resource 104 based on the IUA identifier.

Alternatively, the work scheduler may retrieve the IUA identifier 110 based on the group identifier via a work-scheduler-IUA-resource communications bus 113, and then decrement the IUA count 106 in the IUA resource 104 based on the IUA identifier 110 by accessing the IUA count 106 in the IUA resource 104 via the work-scheduler-IUA-resource communications bus 113.

In general, work flowing through the virtualized scheduler 102 is admitted to the IUE resource 112 by the arbiter 114 enabling the work to be in-flight (i.e., scheduled) and either "descheduled" or completed by a processor core, processor thread, or other work processing entity. Work scheduled to a given work processing entity may be descheduled by the given work processing entity in an event the given work processing entity is unable to complete the work at the time of scheduling. Such descheduled work may be re-scheduled at a later time in order to be completed by the given work processing entity or another work processing entity. Such descheduled work may be queued in a given per-group descheduled queue, such as disclosed below with regard to FIG. 1D.

Figure 1D:
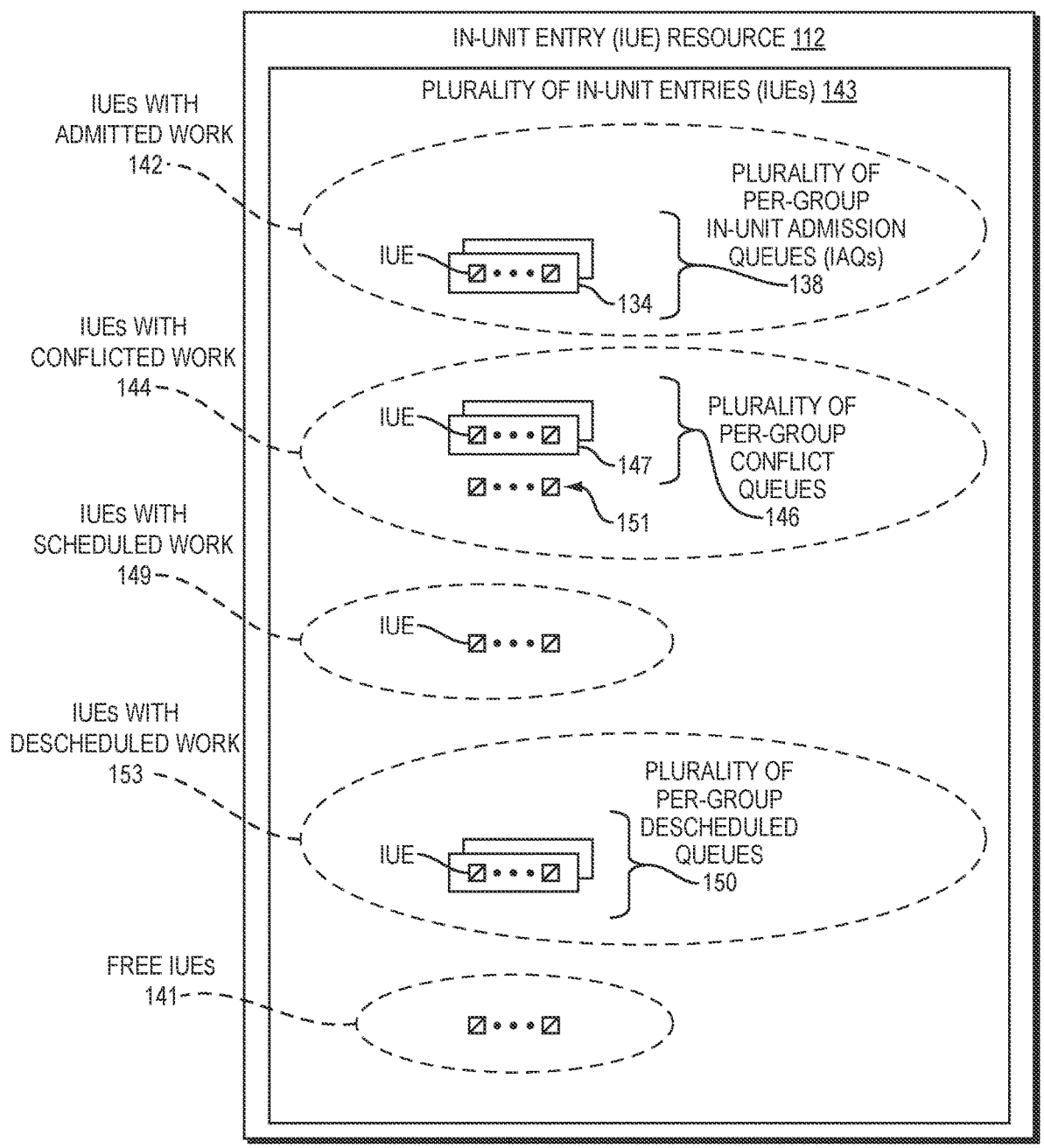
FIG. 1D is a block diagram of an example embodiment of an IUE resource.

FIG. 1D is a block diagram of an example embodiment of the IUE resource 112 of FIGS. 1A and 1B, disclosed above. In the example embodiment, the plurality of IUEs 143 includes free IUEs 141. The free IUEs 141 are available for use by the arbiter 114, disclosed above with regard to FIG. 1A and 1B, for allocating to WQEs (not shown) that are to be admitted to the IUE resource 112. The plurality of IUEs 143 includes IUEs with admitted work 142. Such IUEs are occupied by respective WQEs (not shown) that were moved into (e.g., admitted) the IUE resource 112 by the arbiter 114. It should be understood that such WQEs occupy their respective IUEs until the work associated with such WQEs is completed or otherwise terminated, in which case the respective IUEs they occupy are subsequently freed for reuse.

The IUEs with admitted work 142 are configured to form the plurality of per-group IAQs 138 that include the given per-group IAQ 134. IUEs of a given per-group IAQ of the plurality of per-group IAQs 138, such as the given per-group IAQ 134, are occupied by respective WQEs of a unique given scheduling group that is identified by a respective group identifier included in the respective WQEs. The given per-group IAQ 134 of the plurality of per-group IAQs 138 may be formed by linking respective IUEs to the given per-group IAQ 134 in order to "add" them to the given per-group IAQ 134. For example, the given per-group IAQ may be a linked list or doubly linked list. It should be understood, however, that the plurality of per-group IAQs 138 are not limited to being linked lists or doubly linked lists.

Following admission of a given WQE to the IUE resource 112, the given WQE occupies a given IUE of a given per-group IAQ, such as the given per-group IAQ 134, and is available for scheduling by the work scheduler 148, disclosed above with regard to FIG. 1B. In an event the work scheduler 148 attempts to schedule the given WQE and the attempt fails, the work scheduler 148 may alter metadata (not shown) of its respective IUE, causing its respective IUE to be "moved" from the IUEs with admitted work 142 to the IUEs with conflicted work 144. It should be understood that the IUE is not physically "moved." Rather, the IUE is modified to designate that is occupied by a respective WQE that has conflict and to disassociate the IUE from given pre-group IAQ, thereby "removing" the IUE from the IUEs with admitted work 142.

As an IUE from the IUEs with conflicted work 144, the IUE may be a member of a given per-group conflict queue 147 of a plurality of per-group conflict queues 146. Alternatively, the IUE with conflicted work may be a non-queued IUE with conflicted work of a plurality of non-queued IUEs with conflicted work 151. Such a non-queued IUE with conflicted work may have to wait to be added to a per-group conflict queue.

In an event a conflict that is associated with a respective WQE, occupying a given IUE of the IUEs with conflicted work 144, is cleared, the work scheduler 148 may schedule the respective WQE by assigning it to a workslot and the given IUE may be "moved" to the IUEs with scheduled work 149. It should be understood that the given IUE is not physically moved and that the content thereof is not physically moved. The given IUE is, however, altered to indicate the assigned workslot for the respective WQE.

Similarly, in an event the work scheduler 148 schedules a given WQE occupying a respective IUE of the IUEs with admitted work 142, the work scheduler 148 assigns it to a workslot and alters metadata (not shown) of the respective IUE to indicate that the IUE is no longer linked to a given per-group IAQ of the plurality of per-group IAQs 138, thereby "moving" the respective IUE to the IUEs with scheduled work 149.

In an event a respective WQE, occupying a given IUE of the IUEs with scheduled work 149, is scheduled by the work scheduler 148, but work associated therewith cannot be completed by a work processing entity assigned to a given workslot that is assigned to the respective WQE, the work scheduler 148 may deschedule the respective WQE and the given IUE may be "moved" to the IUEs with descheduled work 153. It should be understood that the given IUE is not physically moved and that the content thereof is not physically moved. The given IUE may, however, be altered to indicate that the respective WQE occupying same has been descheduled. The given IUE may be linked to other IUEs of the IUEs with descheduled work 153 that are occupied by respective WQEs with a same group identifier as the respective WQE, thereby forming a per-group descheduled group 156 of the plurality of per-group descheduled queues 150.

As disclosed above with regard to FIG. 1A, the IUA count 106 represents a global count of WQEs that are associated with the IUA identifier and occupy respective IUEs of the IUE resource 112. As such, continuing with reference to FIG. 1D, the global count of WQEs may be a total number of all IUEs with admitted work 142, IUEs with conflicted work 144, IUEs with scheduled work 149, and IUEs with descheduled work 153, that are occupied by WQEs that are associated with the IUA identifier 110. The WQEs that are associated with the IUA identifier 110 have respective group identifiers that are assigned to the IUA identifier 110.

Referring to FIGS. 1A-D, in order to control whether the given WQE 118 is moved, the arbiter 114 may be further configured to implement the IUA test, disclosed above, and, based on a positive result for the IUA test implemented, to move the given WQE 118 from the given per-group TAQ 132, assigned to the given scheduling group 116, and into the IUE resource 112. The positive result may be based on determining that the IUA count 106 is less than the IUA threshold 108, as disclosed above with regard to expression (1).

The positive result may be further based on determining that a free count (referred to interchangeably herein as "FREE_CNT") is greater than zero, as disclosed above with regard to expression (1). The free count may be a total number of unoccupied IUEs of a plurality of available IUEs of the plurality of IUEs 143, wherein the plurality of available IUEs are available to the arbiter 114 for moving WQEs into the IUE resource 112 for queueing. At least one IUE, of the plurality of IUEs, may be reserved and the plurality of available IUEs may exclude the at least one IUE reserved. The at least one IUE may be reserved to enable WQEs to be added to the IUE resource 112, directly, without having to go be added to a per-group IAQ by the arbiter 114.

The positive result may be further based on determining that a group count (referred to interchangeably herein as "GRP_CNT") is less than or equal to a group reserved threshold (referred to interchangeably herein as "RSVD_THR"), as disclosed above with regard to expression (1). The group count may be a total number of IUEs, of the plurality of IUEs, that are occupied by respective WQEs that belong to the given scheduling group 116 and have never been scheduled by the work scheduler 148. The group reserved threshold may be a given number of reserved IUEs, of the plurality of IUEs, that are reserved for the given scheduling group for occupancy by WQEs that belong to the given scheduling group 116 and have never been scheduled by the work scheduler 148.

A first portion of IUEs, of the plurality of IUEs 143, may be arranged to form a given per-group in-unit admission queue (IAQ) 134 in the IUE resource 112 for the given scheduling group 116. The given per-group IAQ 134 may be created by the arbiter 114 by allocating free IUEs of the plurality of IUEs 143 and moving WQEs belonging to the given scheduling group 116 into the free IUEs allocated. A second portion of IUEs, of the plurality of IUEs 143, may be arranged to form a given per-group conflict queue 147 in the IUE resource 112 for the given scheduling group 116. The second portion of IUEs is occupied by respective WQEs that were moved by the work scheduler 148, from the given per-group IAQ 134 to the given per-group conflict queue 147, in response to respective attempts to schedule the respective WQEs. The respective attempts failed due to respective scheduling conflicts. As such, WQEs occupying respective IUEs of the given per-group IAQ 134 and given per-group conflict queue 147 represent the respective WQEs that belong to the given scheduling group 116 and have never been scheduled by the work scheduler 148.

The arbiter 114 may be further configured to increment the group count in an event the given WQE 118 is moved into the IUE resource 112. In an event the given WQE 118 is scheduled by the work scheduler 148 and work associated with the given WQE 118 is completed, either the arbiter 114 or the work scheduler 148 may be configured to decrement the group count.

The positive result may be further based on determining that a) the free count is greater than a reserved free count (referred to interchangeably herein as "RSVD_FREE"), wherein the reserved free count is counted as part of the free count, and b) the group count is less than a group maximum threshold (referred to interchangeably herein as "MAX_THR"), as disclosed above with regard to expression (1).

The reserved free count may be a total number of unoccupied reserved IUEs from among reserved IUEs, of the plurality of IUEs 143, that are reserved for moving WQEs of respective scheduling groups into the IUE resource 112. The group count may be a total number of IUEs, of the plurality of IUEs, that are occupied by respective WQEs that belong to the given scheduling group 116 and have never been scheduled by the work scheduler 148. The group maximum threshold may be a maximum number of IUEs, of the plurality of IUEs 143, that are permitted to be occupied by WQEs that are from the given scheduling group 116 and that have never been scheduled by the work scheduler 148.

The IUE resource 112 may include the given per-group IAQ 134 for the given scheduling group 116 and the given per-group conflict queue 147 for the given scheduling group 116. The WQEs that are from the given scheduling group 116 and that have never been scheduled may occupy respective IUEs of: the given per-group IAQ 134, given per-group conflict queue 147, or a combination thereof.

The positive result may be further based on determining that the group count is less than or equal to the group reserved threshold or that a) the free count is greater than the reserved free count, wherein the reserved free count is counted as part of the free count, and b) the group count is less than the group maximum threshold, as disclosed above with regard to expression In an event the IUA count 106 is greater than or equal to the IUA threshold 108, the arbiter 114 may be further configured to disregard the given WQE 118 from consideration for movement into the IUE resource 112.

Figure 2:
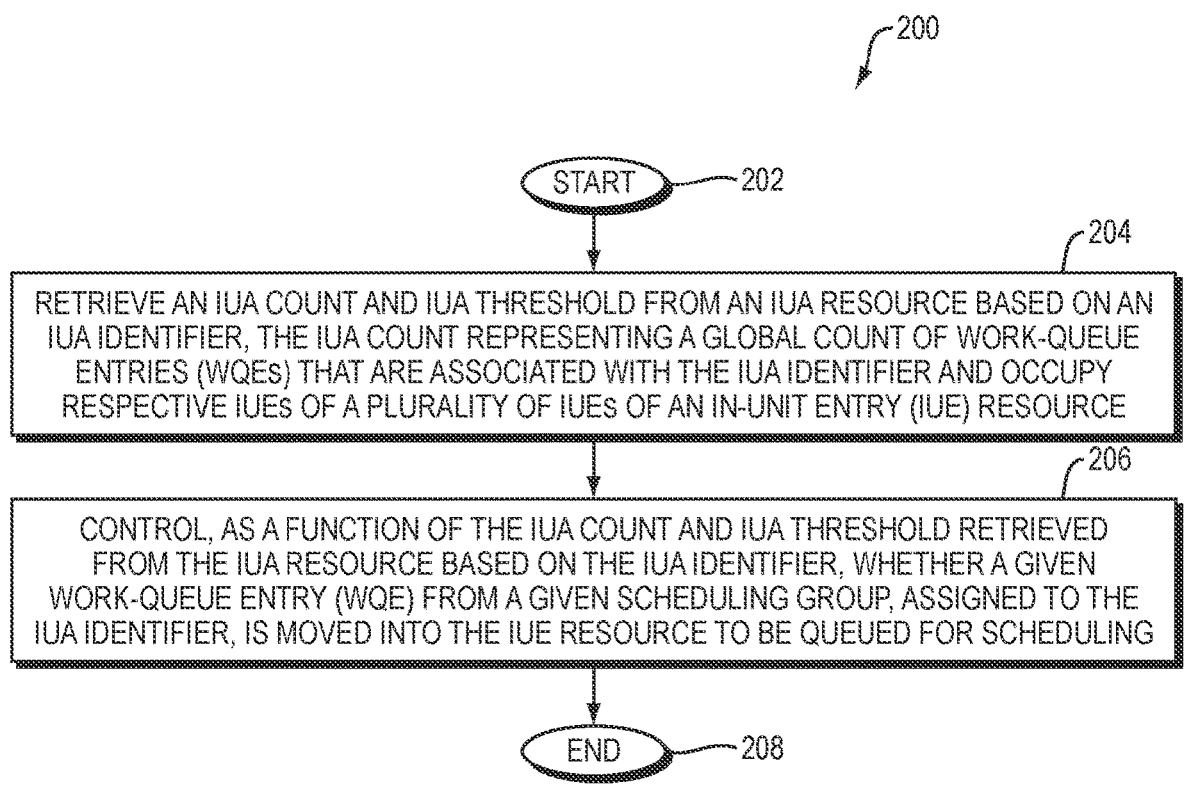
FIG. 2 is a flow diagram of an example embodiment of method for queuing work within a virtualized scheduler based on IUA of IUEs.

FIG. 2 is a flow diagram 200 of an example embodiment of method for queuing work within a virtualized scheduler based on in-unit accounting (IUA) of in-unit entries (IUEs).

The method begins (202) and retrieves an IUA count and IUA threshold from an IUA resource based on an IUA identifier, the IUA count representing a global count of work-queue entries (WQEs) that are associated with the IUA identifier and occupy respective IUEs of a plurality of IUEs of an in-unit entry (IUE) resource, the IUA threshold set to limit the global count (204). The method further comprises controlling, as a function of the IUA count and IUA threshold retrieved from the IUA resource based on the IUA identifier, whether a given WQE from a given scheduling group, assigned to the IUA identifier, is moved into the IUE resource to be queued for scheduling by the virtualized scheduler (206), and the method thereafter ends (208) in the example embodiment.

Figure 3:
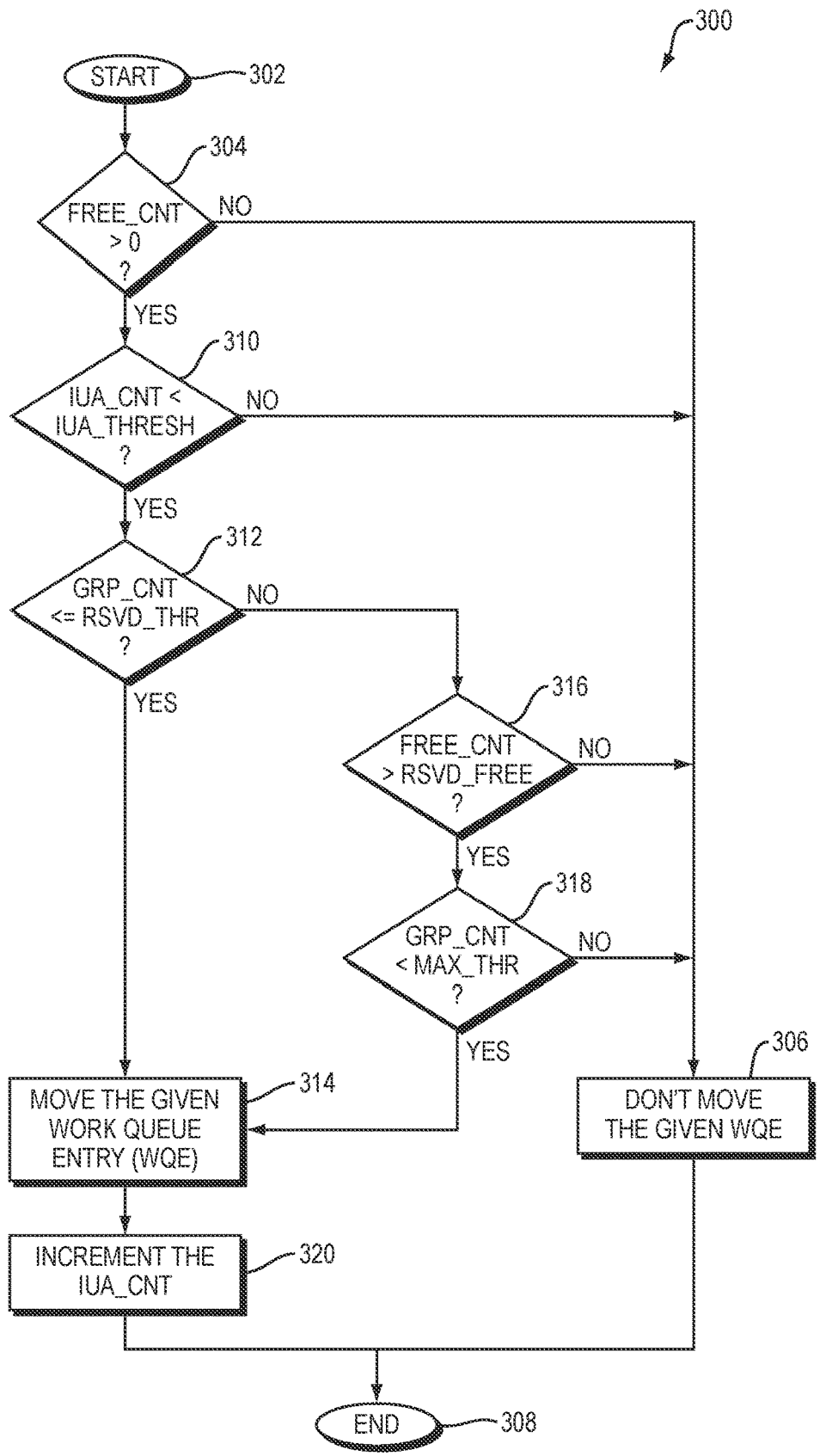
FIG. 3 is a flow diagram of an example embodiment of a method for determining whether to move a given work queue entry (WQE) to an IUE resource.

FIG. 3 is a flow diagram 300 of an example embodiment of a method for determining whether to move a given work queue entry (WQE) to an IUE resource. The method may be implemented by the arbiter 114 of FIG. 1A and FIG. 1B, disclosed above. The method prevents scheduling group(s) assigned to a same IUA identifier from using more than an allocated amount of IAQ resources within the IUE resource.

The method begins (302) and checks whether the FREE_CNT, disclosed above, is greater than zero (304). If the FREE_CNT is not greater than zero, the given WQE is not moved (306), thereby preventing scheduling group(s) assigned to the IUA identifier from using more than an allocated amount of IAQ resources, and the method thereafter ends (308), in the example embodiment.

If, however it is determined at (304) that the FREE_CNT is greater than zero, the method checks for whether the IUA_CNT (i.e., IUA count) is less than the IUA_THRESH (i.e., IUA threshold) (310). If it is determined that the IUA_CNT is not less than the IUA_THRESH, the given WQE is not moved (306), thereby preventing scheduling group(s) assigned to the IUA identifier from using more than an allocated amount of IAQ resources, and the method thereafter ends (308), in the example embodiment.

If, however, it is determined at (310) that the IUA_CNT is less than the IUA_THRESH, the method checks for whether the GRP_CNT is less than or equal to the RSVD_THR (312). If it is determined that the GRP_CNT is less than or equal to the RSVD_THR, the given WQE is moved to the IUE resource (314), the IUA_CNT is incremented (320), and the method thereafter ends (308) in the example embodiment.

If, however, it is determined at (312) that the GRP_CNT is not less than or equal to the RSVD_THR, the method checks for whether the FREE_CNT is greater than the RSVD_FREE (312). If it is determined that the FREE_CNT is not greater than the RSVD_FREE, the given WQE is not moved (306), thereby preventing scheduling group(s) assigned to the IUA identifier from using more than an allocated amount of IAQ resources, and the method thereafter ends (308), in the example embodiment.

If, however, it is determined at (316) that the FREE_CNT is greater than the RSVD_FREE, the method checks for whether the GRP_CNT is less than the MAX_THR (318). If it is determined that the GRP_CNT is less than the MAX_THR, the given WQE is moved to the IUE resource (314), the IUA_CNT is incremented (320), and the method thereafter ends (308) in the example embodiment.

If, however, it is determined at (318) that the GRP_CNT is not less than the MAX_THR, the given WQE is not moved (306), thereby preventing scheduling group(s) assigned to the IUA identifier from using more than an allocated amount of IAQ resources, and the method thereafter ends (308), in the example embodiment.

Figure 4:
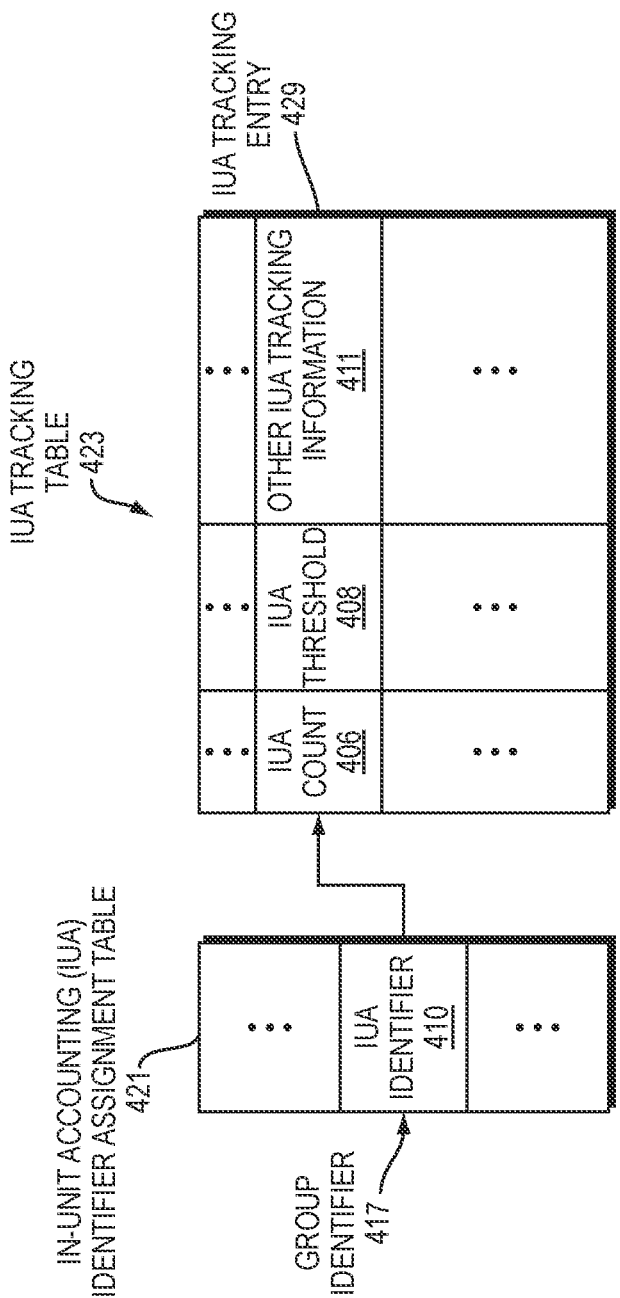
FIG. 4 is a block diagram of an example embodiment of an IUA identifier assignment table and IUA tracking table.

FIG. 4 is a block diagram of an example embodiment of an IUA identifier assignment table 421 and IUA tracking table 423. The IUA identifier assignment table 421 and IUA tracking table 423 may be included in the IUA resource 104, disclosed above. The IUA identifier assignment table 421 may include mappings between scheduling groups and IUA indices. For example, in the example embodiment, a group identifier 417 is assigned to the IUA identifier 410. WQEs that are assigned to a given group (not shown) identified by the group identifier 417 may be configured to include the group identifier 417. The arbiter 114, disclosed above, may use the group identifier 417, that may be included in that given WQE 118, to retrieve the IUA identifier 410.

The IUA identifier 410 may be assigned to a given IUA tracking entry 429 located in the IUA tracking table 423. The arbiter 114 may use the IUA identifier 410 to retrieve the IUA count 406 and IUA threshold 408 from the IUA resource 104. Further, other IUA tracking information 411 may be retrieved from the IUA resource 104 using the group identifier 417 and/or the IUA identifier 410. The tracking information 411 may include, for example, the GRP_CNT, RSVD-THR, MAX_THR, IUA_CNT, IUA_THRESH, and FREE_CNT, disclosed above, that may be used by the arbiter 114 to implement the IUA test defined by expression (1), disclosed above. It should be understood, however, that the IUA tracking information 411 is not limited to the tracking information disclosed above. Further, storing of the IUA identifier 410, IUA count 406, IUA threshold 408, and IUA tracking information 411 may be stored in other tables or multiple entries of tables and are not limited to as disclosed in FIG. 4.

Figure 5:
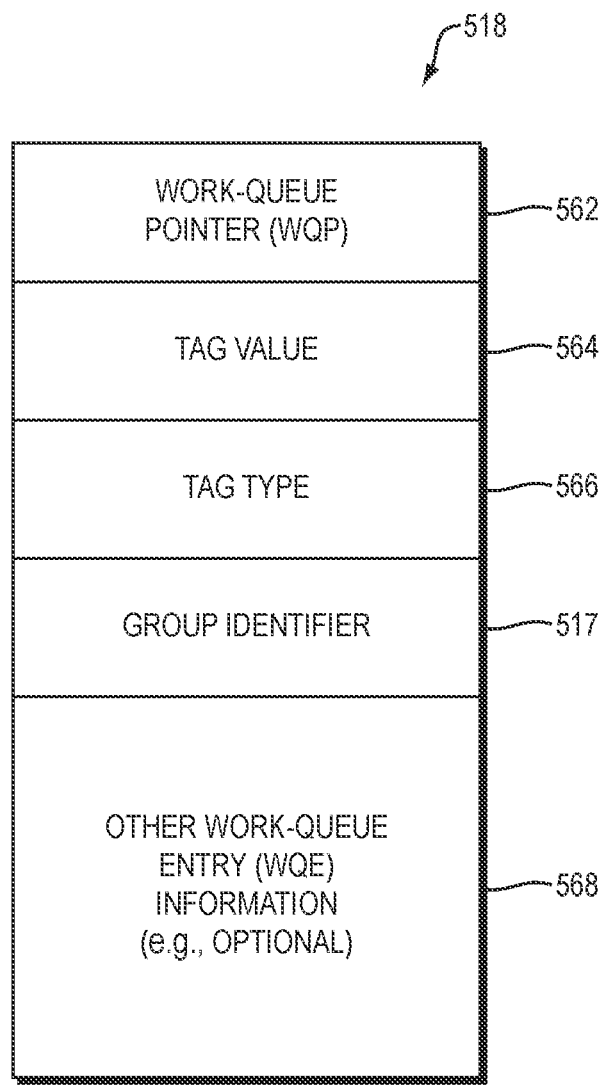
FIG. 5 is a block diagram of an example embodiment of a work-queue entry (WQE).

FIG. 5 is a block diagram of an example embodiment of a work-queue entry (WQE) 518. The WQE 518 includes an identifying pointer, that is, the WQ pointer (WQP) 562, a tag value 564, a tag-type 566, and a group identifier 517. The WQE 518 may further include other WQE information 568.

The tag value 564 associates the WQE 518 with a unique work-flow (not shown). The tag-type 566 specifies whether the unique work-flow is ordered (ordering is guaranteed), atomic (ordering and atomicity are guaranteed), or unordered (no ordering is guaranteed). The group identifier 517 corresponds to the WQE 518 and is a unique identifier that identifies the scheduling group to which the WQE 518 is assigned. The other WQE information 568 may link the WQE 518 to other WQEs in the scheduling group.

The tag value 564 allows the virtualized scheduler 102, disclosed above, to scheduler work for a same flow (from a source to a destination) to be ordered and synchronized. For example, the tag value 564 can be a hash of the standard Transmission Control Protocol (TCP) five-tuple, that is, Internet Protocol (IP) source address, IP destination address, IP protocol, TCP source port, TCP destination port in the header of a data packet defining a unique work "flow." The same flow has the same tag value, so it can be ordered and synchronized. Different flows likely have different tag values, so will not be ordered and synchronized, and can be executed completely in parallel on different processor cores. The tag type 566 identifies the type of ordering and synchronization to be performed.

As all work is not equal, different WQEs may belong to different scheduling groups. Groups provide a means to execute different functions on different cores, even though all cores are shared by the virtualized scheduler 102. For example, packet processing can be pipelined from one group of cores to another group of cores, with the first group performing the first stage of the work and the next group performing the next stage of the work by defining the groups from which a processor core will accept work. Groups allow each processor core to specify the types of work it will accept, allowing the work scheduler 148 to dynamically distribute the work to available processor cores.

A processor core, such as any one of the processor cores disclosed below with regard to FIG. 6A, may request work from the work scheduler 148. Typically, the processor core polls the work scheduler 148 to find work. However, in some cases the work scheduler 148 can be selected to interrupt the processor core when it has work for the processor core. The work scheduler 148 selects, that is, schedules the work to the processor core based on the groups from which the processor core accepts work. The work scheduler 148 does not schedule a piece of work for a processor core if the processor core does not accept the group associated with the work, that is, if the processor core does not accept WQEs with the group identifier 517 of the group.

The WQP 562 may point to WQE data (not shown) that may be stored in memory of a network services processor, such as the network services processor 650 of FIG. 6A, disclosed further below. The work-queue data may be a packet descriptor that describes a packet received, for example, by the network interface unit (NIX) 671 of FIG. 6A. The packet descriptor may include information, such as an input port that a packet arrived on, number of bytes of the packet, pointer to the packet, other information based on data in fields of the packet, etc. It should be understood that the work-queue data is not limited to a packet descriptor and that the packet descriptor can include information in addition to and/or other than disclosed above.

As disclosed above, the tag type 566 may be atomic, ordered, or untagged. With reference to FIG. 5 and FIG. 1B, disclosed above, if the tag type 566 is atomic, the work scheduler 148 will only allow one WQE with this tag type to be active at a time. If the tag type 566 is ordered, the work scheduler 148 can schedule multiple WQEs with the same tag value 564, but the work scheduler 148 maintains the ordering between those multiple packets and, in addition, the scheduler can "switch" the tag type 566 to become atomic so that processors can determine the correct packet order. If the tag type 566 is untagged, the work scheduler 148 does not track any ordering for the packets. This tag type 566 may be determined, e.g., by the configuration of a given queue or port of the NIX 671 that receives the packets, to match (e.g., be consistent with) a behavior of software that will process the packets.

Work associated with different WQEs may be unrelated and can execute entirely in parallel on different cores when the WQEs have different tag values or tag types. WQEs associated with a same flow may have the same tag value 564, so they may be ordered and synchronized. WQEs associated with different flows will likely have different tag values, so will likely not be ordered and synchronized, and can be executed completely in parallel on different processor cores, such as the processor cores 640a-k of FIG. 6A, disclosed below.

Figure 6A:
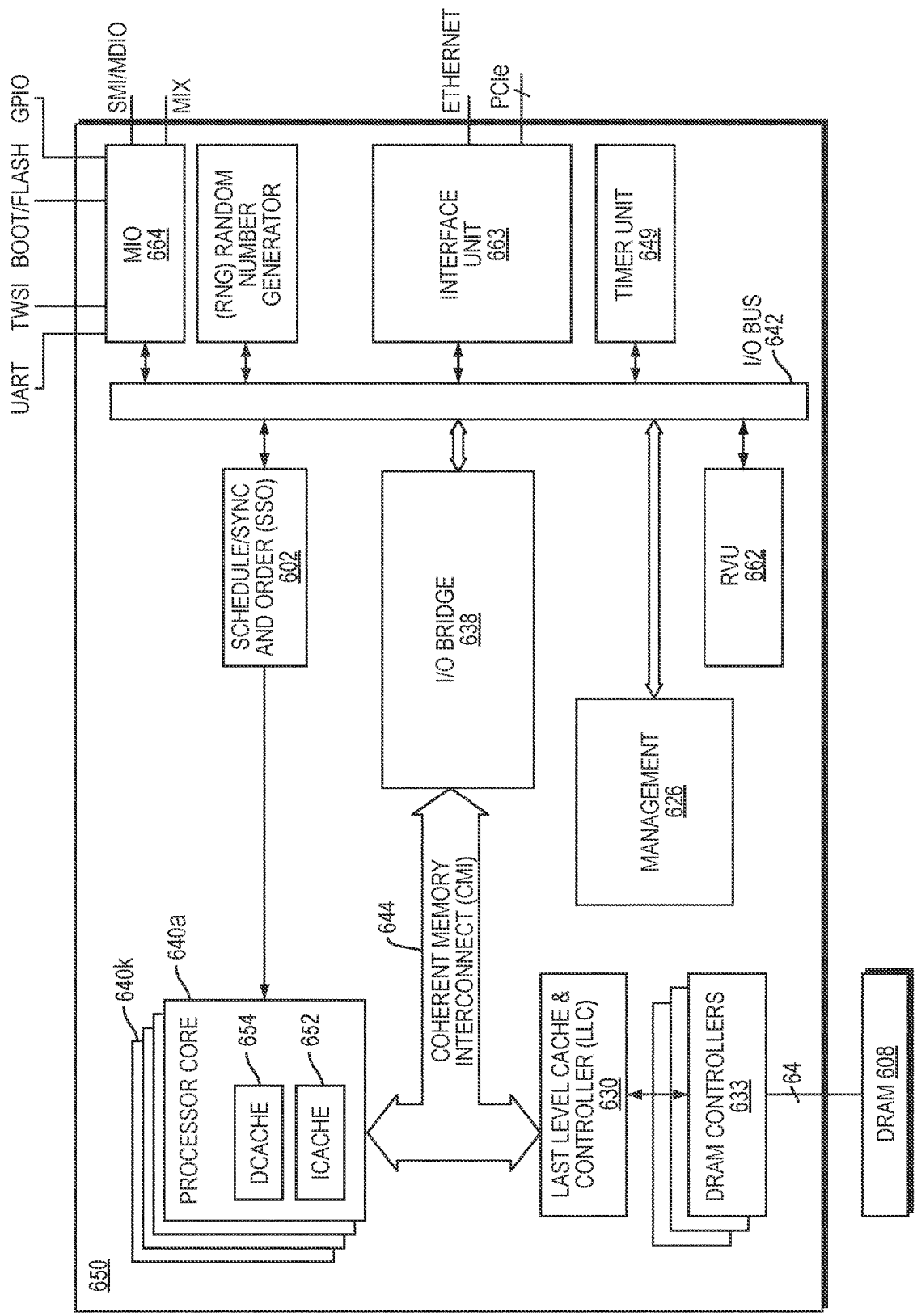
FIG. 6A is a block diagram of an example embodiment of a network services processor in which an example embodiment may be implemented.

FIG. 6A is a block diagram of an example embodiment of a network services processor 650 in which an example embodiment disclosed herein may be implemented. The network services processor 650 may process Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 650 may schedule and queue work (packet processing operations) for upper level network protocols, for example L4-L7, and allow processing of upper level network protocols in received packets to be performed to forward packets at wire-speed. The network services processor 650 may schedule and queue work for applications that may be restricted to lower layers, e.g., forwarding at L2 or L3 at wire-speed. Wire-speed is the rate of data transfer of the network over which data is transmitted and received. By processing the protocols to forward the packets at wire-speed, the network services processor 650 does not slow down the network data transfer rate.

A packet is received for processing by an interface unit 663. The interface unit 663 performs pre-processing of the received packet by checking various fields in the network protocol headers (e.g., L2, L3 and L4 headers) included in the received packet, and may perform checksum checks for TCP/User Datagram Protocol (UDP) (L3 network protocols). The interface unit 663 may receive packets based on multiple network interface protocols, such as Ethernet and Peripheral Component Interconnect Express (PCIe). In a further embodiment, the interface unit 663 may be configured to receive packets from a plurality of X Attachment Unit Interfaces (XAUIs), Reduced X Attachment Unit Interfaces (RXAUIs), Serial Gigabit Media Independent Interfaces (SGMIIs), 40GBASE-R, 50GBASE-R, and/or 100GBASE-R. The interface unit 663 may also prepare and transmit outgoing packets based on one or more of the aforementioned interfaces.

The interface unit 663 may write packet data into buffers in the last level cache and controller (LLC) 630 or external DRAM 608. The packet data may be written into the buffers in a format convenient to higher-layer software executed in at least one processor core of the processor cores 640a-k. Thus, further processing of higher level network protocols is facilitated.

The network services processor 650 can also include one or more application specific co-processors. These co-processors, when included, offload some of the processing from the processor cores 640a-k, thereby enabling the network services processor 650 to achieve high-throughput packet processing.

An I/O bridge 638 is configured to manage the overall protocol and arbitration and provide coherent I/O portioning with an I/O Bus 642. The I/O bridge 638 may include buffer queues for storing information to be transferred between a coherent memory interconnect (CMI) 644, the I/O Bus 642, and the interface unit 663. The I/O bridge 638 may comprise a plurality of individual bridges on which communications and arbitration can be distributed.

The miscellaneous I/O (MIO) interface 664 can include auxiliary interfaces such as General Purpose I/O (GPIO), Flash, IEEE 802 two-wire Management Data I/O (MDIO) Interface, Serial Management Interface (SMI), Universal Asynchronous Receiver-Transmitters (UARTs), two-wire serial interface (TWSI), and other serial interfaces.

A Schedule/Sync and Order (SSO) module 602 queues and schedules work for the processor cores 640a-k. According to an example embodiment, the SSO module 602 is the virtualized scheduler 102, disclosed above with regard to FIG. 1A. The network service processor 650 includes a timer unit 649 that may be used by the SSO module 602 to schedule work for the processor cores 640a-k.

The processor cores 640a-k may request work from the SSO module 648. The SSO module 602 selects (i.e., schedules) work for one of the processor cores 640a-k and returns a pointer to the work-queue entry describing the work to a given processor core of the processor cores 640a-k.

Each processor core includes an instruction cache 652 and Level-1 data cache 154. In one embodiment, the network services processor 650 includes 24 processor cores 640a-k. In some embodiments, each of the processor cores 640a-k may be an implementation of the Arm® architecture, such as the Armv8.2 64-bit architecture, and may be compatible with the Armv8.2 software ecosystem and include hardware floating point, single instruction multiple data (SIMD), and memory management unit (MMU) support. In such an embodiment, consistent with the Armv8.2 architecture, the processor cores 640a-k may contain full hardware support for virtualization. Guest operating systems can thus run at Arm defined user and operating system privilege levels, and hypervisor software can run in a separate higher privilege level. The processor cores 640a-k may also support a secure state in which software may run in three different privilege levels while hardware provides isolation from the non-secure state. It should be understood that a total number of the processor cores 640a-k is not limited to 24 and that an architecture of the processor cores 640a-k is not limited to a 64-bit architecture or to the Armv8.2 64-bit architecture.

Last level cache and controller (LLC) 630 and external DRAM 608 are shared by all of the processor cores 640a-k and I/O co-processor devices (not shown). Each processor core is coupled to the LLC 630 by the CMI 644. The CMI 644 is a communication channel for all memory and I/O transactions between the processor cores 640a-k, the I/O bridge 638 and the LLC 630. In one embodiment, the CMI 644 is scalable to multiple (e.g., 24) processor cores 640a-k, supporting fully-coherent Level-1 data caches 654 with write through. The CMI 644 may be highly-buffered with the ability to prioritize I/O.

The controller of the LLC 630 maintains memory reference coherence. It returns the latest copy of a block for every fill request, whether the block is stored in LLC 630, in external DRAM 608, or is "in-flight." A plurality of DRAM controllers 633 supports the external DRAM 608, and can support preferred protocols, such as the DDR4 protocol.

After a packet has been processed by the processor cores 640a-k, the interface unit 663 reads the packet data from the LLC 630, DRAM 608, performs L4 network protocol post-processing (e.g., generates a TCP/UDP checksum), forwards the packet through the interface unit 663 and frees the LLC 630/DRAM 608 used by the packet. The DRAM Controllers 633 manage in-flight transactions (loads/stores) to/from the DRAM 608.

A resource virtualization unit (RVU) 662 may enable software to map various local function (LF) resources in various modules into several physical functions (PFs) and virtual functions (VFs). This enables multi-unit software drivers compatible with Linux®, Windows® and the data plane development kit (DPDK).

A management module 626 may include various units for managing operation of the network services processor 650. For example, the management module 626 may include a temperature sensor, a power serial bus master interface to determine current performance and energy consumption, and a memory diagnostic controller to detect and report memory errors. The management module 626 may further include control processors, such as a system control processor (not shown) for power management and other secure chip management tasks, and a module control processor (not shown) for module management and other non-secure chip management tasks.

Figure 6B:
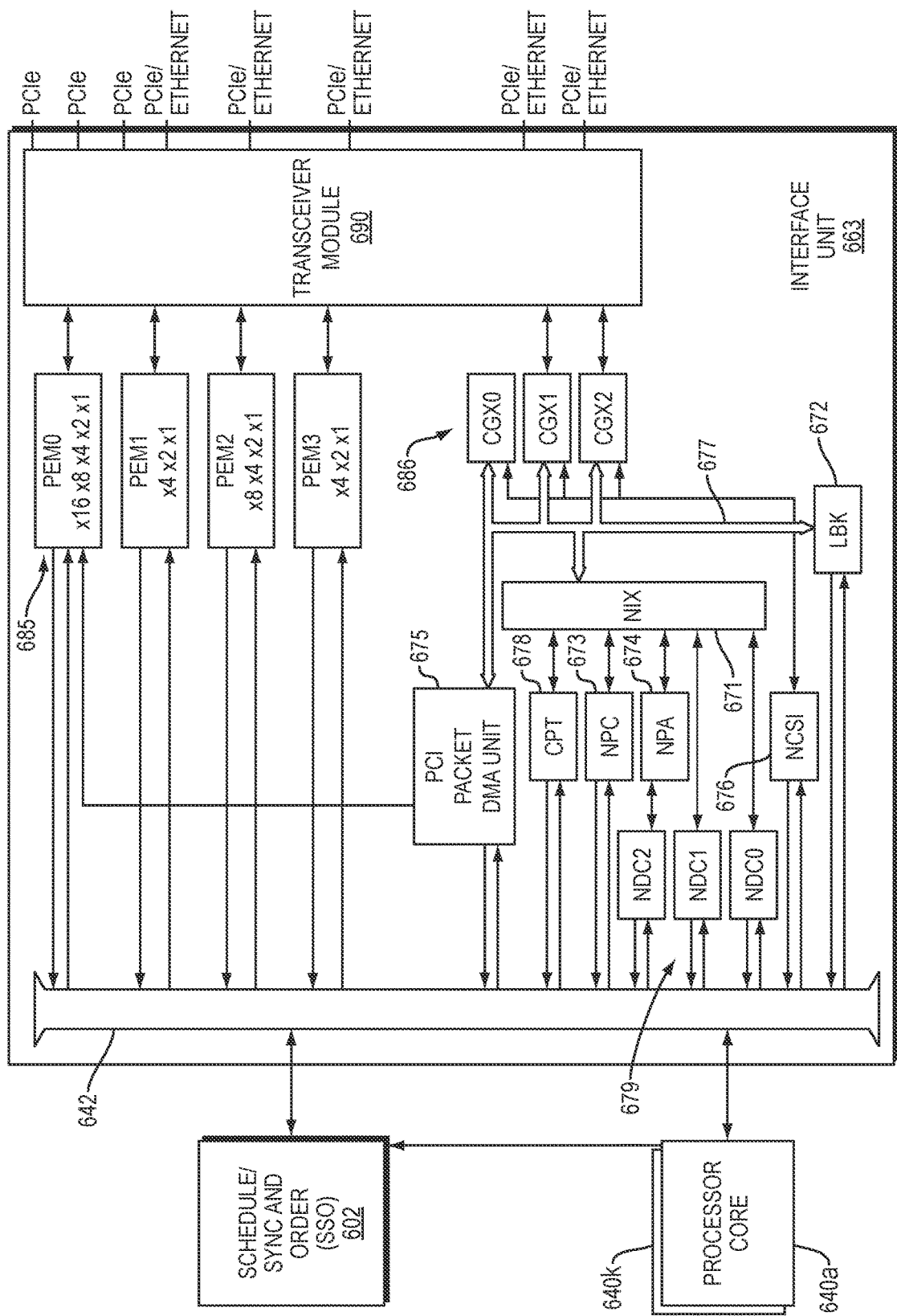
FIG. 6B is a block diagram of an example embodiment of an interface unit of the network services processor of FIG. 6A.

FIG. 6B is a block diagram of an example embodiment of the interface unit 663 of the network services processor 650 of FIG. 6A, disclosed above. Transceiver module 690 transmits and receives signals in accordance with one or more communications protocols, such as PCIe, Ethernet. Interface modules, including PCI Express interface units (PEM0-PEM3) 685, and Ethernet I/O controllers (CGX0-CGX2) 686 process received and outgoing signals in accordance with their respective protocols. A network controller sideband interface (NCSI) unit 676 provides an interface and protocol controller for a NCSI bus 677, which provides network packet data from/to the Ethernet I/O controllers (CGX0-CGX2) 686.

A network interface unit (NIX) 671 provides a controller (not shown) and direct memory access (DMA) engines (not shown) to process and move network packets (not shown). The NIX 671 transmits and receives packets to and from the aforementioned interfaces modules 685, and communicates with the SSO module 602 to schedule work for the processor cores 640a-k to further process the packets. The NIX 671 may also communicate with the processor cores 640a-k to forward work in lieu of the SSO module 602, and can receive packets from the processor cores 640a-k for transmission. The NIX 671 may include a transmit subunit (NIX-TX) (not shown) and a receive subunit (NIX-RX) (not shown), and a loopback module (LBK) 672 enables packets transmitted by the NIX-TX to be looped back and received by the NIX-RX.

The NIX 671 operates with a number of coprocessors. In particular, a network parser CAM unit (NPC) 673 parses network packets received for, or transmitted from, the NIX 671. A network pool allocator unit (NPA) 674 may allocate and free pointers for packet, work-queue entry, send descriptor buffers, and may support integration with a virtualization scheme. The SSO module 602, as described above, schedules work-queue entries for NIX packets. A cryptographic accelerator unit (CPT) 678 optionally decrypts Internet Protocol Security (IPsec) packets received by the NIX 671 and can encrypt data for outgoing packets. The interface unit 663 includes a PCI packet DMA unit 675 that may DMA packet data between the NIX 671, CGX0-CGX2, PEM0-PEM3 685, or LBK 672 and the LLC 630 or DRAM 608, disclosed above with regard to FIG. 6A. The interface unit 663 further includes a data cache (NDC0-NDC1) 679 that is a common data cache block for use by the NIX 671 and NPA 674.

As disclosed above, the NIX 671 transmits and receives packets to and from the aforementioned interface modules 685, and communicates with the SSO module 602 to schedule work for the processor cores 640a-k to further process the packets. According to an example embodiment, the SSO module 602 may be a virtualized scheduler, such as the virtualized scheduler 102 of FIG. 1B, disclosed above. Within the SSO module 602, a method for queueing work may be based on in-unit accounting (IUA) of in-unit entries (IUEs), such as disclosed above with regard to FIG. 2.

Referring back to FIG. 2, the method may further comprise assigning a plurality of scheduling groups to the IUA identifier. The plurality of scheduling groups includes the given scheduling group.

The controlling may include determining whether the given WQE is to be moved and, in an event it is determined that the given WQE is to be moved, the method may further comprise (i) allocating a free IUE of the plurality of IUEs, the free IUE to be used as a given IUE for admitting the given WQE into the resource, (ii) moving the given WQE from a given per-group transitory admission queue (TAQ) to the given IUE, (iii) adding the given IUE to a given per-group in-unit admission queue (IAQ) for the given scheduling group or associating the given IUE with the given scheduling group to create the given per-group IAQ for the scheduling group, and (iv) updating the IUA count in the IUA resource based on the IUA identifier, wherein the given per-group TAQ includes queued WQEs received for the given scheduling group.

Updating the IUA count may include incrementing the IUA count. Moving the given WQE to occupy the given IUE enables the given WQE to be available for scheduling. In an event the given WQE is scheduled, the method may further comprise assigning the given WQE to a given workslot of a plurality of workslots.

The method may further comprise, in response to a notification that work associated with the given WQE has been completed, freeing the given IUE for reuse and causing the IUA count in the IUA resource to be decremented.

The method may further comprise retrieving the global count from the IUA resource based on the IUA identifier, wherein the global count is a total number of all admitted, conflicted, scheduled, and descheduled WQEs that are associated with the IUA identifier and occupy respective IUEs of the plurality of IUEs.

The controlling may include implementing an IUA test. The implementing may include comparing the IUA count to the IUA threshold. Based on a positive result for the IUA test implemented, the method may further include moving the given WQE from a given per-group transitory admission queue (TAQ), assigned to the given scheduling group, and into the IUE resource. The positive result may be based on determining that the IUA count is less than the IUA threshold as a function of the comparing.

The positive result may be further based on determining that a free count is greater than zero. The free count may be a total number of unoccupied IUEs of a plurality of available IUEs of the plurality of IUEs. The plurality of available IUEs may be available to an arbiter for moving WQEs into the IUE resource for queueing.

The method may further comprise reserving at least one IUE, of the plurality of IUEs. The plurality of available IUEs may exclude the at least one IUE reserved.

The positive result may be further based on determining that a group count is less than or equal to a group reserved threshold. The group count may be a total number of IUEs, of the plurality of IUEs, that are occupied by respective WQEs that belong to the given scheduling group and have never been scheduled by the virtualized scheduler. The group reserved threshold may be a given number of reserved IUEs, of the plurality of IUEs, that are reserved for the given scheduling group for occupancy by WQEs that belong to the given scheduling group and that have never been scheduled by the virtualized scheduler.

The method may further comprise incrementing the group count in an event the given WQE is moved into the IUE resource and decrementing the group count in an event the given WQE is scheduled by the virtualized scheduler and work associated with the given scheduling is completed.

The positive result may be further based on determining that a) the free count is greater than a reserved free count, wherein the reserved free count is counted as part of the free count, and b) a group count is less than a group maximum threshold. The reserved free count may be a total number of unoccupied reserved IUEs from among reserved IUEs, of the plurality of IUEs, that are reserved for moving WQEs of respective scheduling groups into the IUE resource. The group count may be a total number of IUEs, of the plurality of IUEs, that are occupied by respective WQEs that belong to the given scheduling group and have never been scheduled by the virtualized scheduler. The group maximum threshold may be a maximum number of IUEs, of the plurality of IUEs, that are permitted to be occupied by WQEs that are from the given scheduling group and that have never been scheduled by the virtualized scheduler.

The IUE resource may include a given per-group IAQ for the given scheduling group and a given per-group conflict queue for the given scheduling group. WQEs that are from the given scheduling group and that have never been scheduled may occupy respective IUEs of: the given per-group IAQ, given per-group conflict queue, or a combination thereof.

The positive result may be further based on determining that a group count is less than or equal to a group reserved threshold or that a) the free count is greater than a reserved free count, wherein the reserved free count is counted as part of the free count, and b) a group count is less than a group maximum threshold.

In an event the IUA count is greater than or equal to the IUA threshold, the method may further comprise disregarding the given WQE from consideration for movement into the IUE resource.

The IUA resource may include at least one lookup table. The retrieving may include retrieving from a given lookup table of the at least one lookup table, the given lookup table storing a plurality of respective IUA count and IUA threshold pairings each associated with a respective IUA identifier.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read-only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:
1. A system comprising:
an in-unit accounting (IUA) resource configured to store, in association with an IUA identifier, an IUA count and IUA threshold, the IUA count representing a global count of work-queue entries (WQEs) that are associated with the IUA identifier and occupy respective in-unit entries (IUEs) of an in-unit entry (IUE) resource, the IUA threshold set to limit the global count; and an arbiter configured to move a work queue entry (WQE) from a per-group transitory admission queue (TAQ) into a per-group in-unit admission queue (IAQ) in the IUE resource to be queued for scheduling by a work scheduler, the per-group TAQ and per-group IAQ assigned to a scheduling group, the arbiter further configured to retrieve the IUA count and IUA threshold from the IUA resource, based on the IUA identifier, and to control, as a function of the IUA count and IUA threshold retrieved, whether the WQE from the scheduling group, assigned to the IUA identifier, is moved into the IUE resource to be queued for scheduling by the work scheduler.

2. The system of claim 1, wherein a plurality of scheduling groups is assigned to the IUA identifier and wherein the plurality of scheduling groups includes the scheduling group.

3. The system of claim 1, wherein the IUA identifier corresponds to a virtual machine, an application, or a physical function (PF) or virtual function (VF) associated with a single root I/O virtualization (SR-IOV) interface.

4. The system of claim 1, wherein the work scheduler is configured to access the IUE resource.

5. The system of claim 1, wherein:
the IUE resource includes a plurality of IUEs; and
in an event the arbiter determines that the WQE is to be moved into the IUE resource, the arbiter is further configured to:
allocate a free IUE of the plurality of IUEs to be used as an IUE for moving the WQE into the IUE resource;
move the WQE from the per-group TAQ to the IUE;
add the IUE to the per-group IAQ for the scheduling group or associate the IUE with the scheduling group to create the per-group IAQ for the scheduling group; and
cause the IUA count in the IUA resource to be updated.

6. The system of claim 5, wherein, to cause the IUA count to be updated, the arbiter is further configured to cause the IUA count to be incremented.

7. The system of claim 5, wherein:
moving the WQE to occupy the IUE enables the WQE to be available for scheduling by the work scheduler; and
in an event the work scheduler determines that the WQE is to be scheduled, the work scheduler is configured to assign the WQE to a workslot of a plurality of workslots.

8. The system of claim 7, wherein:
in an event the WQE is assigned to the workslot and work associated with the WQE is completed, the work scheduler is further configured to free the IUE for reuse and either the work scheduler or the arbiter is further configured to cause the IUA count in the IUA resource to be decremented.

9. The system of claim 1, wherein the IUA threshold is a maximum value for the IUA count and represents a maximum number of IUEs in the IUE resource that are permitted to be occupied by respective WQEs from among all scheduling groups assigned to the IUA identifier.

10. The system of claim 1, wherein the IUE resource includes a plurality of IUEs and wherein the global count of WQEs is a total number of all admitted, conflicted, scheduled, and descheduled WQEs that are associated with the IUA identifier and occupy respective TUEs of the plurality of IUEs.

11. The system of claim 1, wherein, to control whether the WQE is moved, the arbiter is further configured to implement an IUA test and, based on a positive result for the IUA test implemented, to move the WQE from the per-group TAQ, assigned to the scheduling group, and into the IUE resource, wherein the positive result is based on determining that the IUA count is less than the IUA threshold.

12. The system of claim 11, wherein the positive result is further based on determining that a free count is greater than zero and wherein the free count is a total number of unoccupied IUEs of a plurality of available IUEs of a plurality of IUEs of the IUE resource, the plurality of available IUEs available to the arbiter for moving WQEs into the IUE resource for queueing.

13. The system of claim 12, wherein at least one IUE, of the plurality of IUEs, is reserved and wherein the plurality of available TUEs excludes the at least one IUE reserved.

14. The system of claim 12, wherein the positive result is further based on determining that a group count is less than or equal to a group reserved threshold and wherein:
the group count is a total number of IUEs, of the plurality of IUEs, that are occupied by respective WQEs that belong to the scheduling group and have never been scheduled by the work scheduler; and
the group reserved threshold is a number of reserved IUEs, of the plurality of IUEs, that are reserved for the scheduling group for occupancy by WQEs that belong to the scheduling group and have never been scheduled by the work scheduler.

15. The system of claim 14, wherein:
a first portion of IUEs, of the plurality of IUEs, is arranged to form the per-group IAQ in the IUE resource for the scheduling group, the per-group IAQ created by the arbiter by allocating free IUEs of the plurality of IUEs and moving WQEs belonging to the scheduling group into the free IUEs allocated;
a second portion of IUEs, of the plurality of IUEs, is arranged to form a per-group conflict queue in the IUE resource for the scheduling group, the second portion of IUEs occupied by respective WQEs that were moved by the work scheduler, from the per-group IAQ to the per-group conflict queue, in response to respective attempts to schedule the respective WQEs, the respective attempts having failed due to respective scheduling conflicts; and
WQEs occupying respective IUEs of the per-group IAQ and the per-group conflict queue representing the respective WQEs that belong to the scheduling group and have never been scheduled by the work scheduler.

16. The system of claim 15, wherein the arbiter is further configured to increment the group count in an event the WQE is moved into the IUE resource and wherein, in an event the WQE is scheduled by the work scheduler and work associated with the WQE is completed, either the arbiter or the work scheduler is configured to decrement the group count.

17. The system of claim 12 wherein the positive result is further based on determining that a) the free count is greater than a reserved free count, wherein the reserved free count is counted as part of the free count, and b) a group count is less than a group maximum threshold.

18. The system of claim 17, wherein:
the reserved free count is a total number of unoccupied reserved IUEs from among reserved IUEs, of the plurality of IUEs, that are reserved for moving WQEs of respective scheduling groups into the IUE resource;

the group count is a total number of IUEs, of the plurality of IUEs, that are occupied by respective WQEs that belong to the scheduling group and have never been scheduled by the work scheduler; and the group maximum threshold is a maximum number of IUEs, of the plurality of IUEs, that are permitted to be occupied by WQEs that are from the scheduling group and that have never been scheduled by the work scheduler.

19. The system of claim 18, wherein:

the IUE resource includes the per-group IAQ for the scheduling group and a per-group conflict queue for the scheduling group; and the WQEs that are from the scheduling group and that have never been scheduled occupy respective IUEs of: the per-group IAQ, per-group conflict queue, or a combination thereof.

20. The system of claim 17, wherein the positive result is further based on determining that a group count is less than or equal to a group reserved threshold or that a) the free count is greater than a reserved free count, wherein the reserved free count is counted as part of the free count, and b) a group count is less than a group maximum threshold.

21. The system of claim 1, wherein, in an event the IUA count is greater than or equal to the IUA threshold, the arbiter is further configured to disregard the WQE from consideration for movement into the IUE resource.

22. The system of claim 1, wherein the IUA resource includes a lookup table configured to store a plurality of respective IUA count and IUA threshold pairings each associated with a respective IUA identifier.

23. The system of claim 1, wherein the WQE includes:
an identifying pointer;
a tag value, the tag value associating the WQE with a unique work-flow;
a tag-type, the tag-type specifying whether the unique work-flow is ordered, atomic, or un-ordered; and
a group identifier, the group identifier corresponding to the scheduling group.

24. A method comprising:

moving a work-queue entry (WQE) from a per-group transitory admission queue (TAQ) into a per-group in-unit admission queue (IAQ) in an in-unit entry (IUE) resource to be queued for scheduling by a work scheduler, the per-group TAQ and per-group IAQ assigned to the scheduling group, the moving including:

retrieving an in-unit accounting (IUA) count and IUA threshold from an IUA resource based on an IUA identifier, the IUA count representing a global count of work-queue entries (WQEs) that are associated with the IUA identifier and occupy respective in-unit entries (IUEs) of a plurality of IUEs of the IUE resource, the IUA threshold set to limit the global count; and controlling, as a function of the IUA count and IUA threshold retrieved from the IUA resource based on the IUA identifier, whether the WQE from the scheduling group, assigned to the IUA identifier, is moved into the IUE resource to be queued for scheduling by the work scheduler.

25. The method of claim 24, further comprising assigning a plurality of scheduling groups to the IUA identifier, the plurality of scheduling groups including the scheduling group.

26. The method of claim 24, wherein the IUA identifier corresponds to a virtual machine, an application, or a physical function (PF) or virtual function (VF) associated with a single root I/O virtualization (SR-IOV) interface.

27. The method of claim 24, wherein the controlling includes determining whether the WQE is to be moved and, in an event it is determined that the WQE is to be moved, the method further comprises:

allocating a free IUE of the plurality of IUEs, the free IUE to be used as an IUE for admitting the WQE into the IUE resource;

moving the WQE from the per-group TAQ to the IUE;

adding the IUE to the per-group IAQ for the scheduling group or associating the IUE with the scheduling group to create the per-group IAQ for the scheduling group; and updating the IUA count in the IUA resource based on the IUA identifier, wherein the per-group TAQ includes queued WQEs received for the scheduling group.

28. The method of claim 27, wherein updating the IUA count includes incrementing the IUA count.

29. The method of claim 27, wherein moving the WQE to occupy the IUE enables the WQE to be available for scheduling and wherein, in an event the WQE is scheduled, the method further comprises:

assigning the WQE to a workslot of a plurality of workslots.

30. The method of claim 29, wherein the method further comprises:

in response to a notification that work associated with the WQE has been completed, freeing the IUE for reuse; and causing the IUA count in the IUA resource to be decremented.

31. The method of claim 27, wherein the IUA threshold is a maximum value for the IUA count and represents a maximum number of IUEs in the IUE resource that are permitted to be occupied by respective WQEs from among all scheduling groups assigned to the IUA identifier.

32. The method of claim 27, wherein the method further comprises:

retrieving the global count from the IUA resource based on the IUA identifier, wherein the global count is a total number of all admitted, conflicted, scheduled, and descheduled WQEs that are associated with the IUA identifier and occupy respective IUEs of the plurality of IUEs.

33. The method of claim 27, wherein the controlling includes:

implementing an IUA test, the implementing including comparing the IUA count to the IUA threshold; and based on a positive result for the IUA test implemented, moving the WQE from the per-group TAQ, assigned to the scheduling group, and into the TUE resource, wherein the positive result is based on determining that the IUA count is less than the IUA threshold as a function of the comparing.

34. The method of claim 33, wherein the positive result is further based on determining that a free count is greater than zero and wherein the free count is a total number of unoccupied IUEs of a plurality of available IUEs of the plurality of IUEs, the plurality of available IUEs available to an arbiter for moving WQEs into the IUE resource for queueing.

35. The method of claim 34, further comprising reserving at least one IUE, of the plurality of IUEs, and wherein the plurality of available IUEs excludes the at least one IUE reserved.

36. The method of claim 33, wherein the positive result is further based on determining that a group count is less than or equal to a group reserved threshold and wherein:
the group count is a total number of IUEs, of the plurality of IUEs, that are occupied by respective WQEs that belong to the scheduling group and have never been scheduled by the work scheduler; and
the group reserved threshold is a number of reserved IUEs, of the plurality of IUEs, that are reserved for the scheduling group for occupancy by WQEs that belong to the scheduling group and have never been scheduled by the work scheduler.

37. The method of claim 36, wherein:
a first portion of IUEs, of the plurality of IUEs, is arranged to form the per-group IAQ in the IUE resource for the scheduling group, the per-group IAQ created by an arbiter by allocating free IUEs of the plurality of IUEs and moving WQEs belonging to the scheduling group into the free IUEs allocated;
a second portion of IUEs, of the plurality of IUEs, is arranged to form a per-group conflict queue in the IUE resource for the scheduling group, the second portion of IUEs occupied by respective WQEs that were moved by the work scheduler, from the per-group IAQ to the per-group conflict queue, in response to respective attempts to schedule the respective WQEs, the respective attempts having failed due to respective scheduling conflicts; and
WQEs occupying respective IUEs of the per-group IAQ and per-group conflict queue representing the respective WQEs that belong to the scheduling group and have never been scheduled by the work scheduler.

38. The method of claim 37, further comprising:
incrementing the group count in an event the WQE is moved into the IUE resource; and
decrementing the group count in an event the WQE is scheduled by the work scheduler and work associated with the WQE is completed.

39. The method of claim 34, wherein the positive result is further based on determining that a) the free count is greater than a reserved free count, wherein the reserved free count is counted as part of the free count, and b) a group count is less than a group maximum threshold.

40. The method of claim 39, wherein:
the reserved free count is a total number of unoccupied reserved IUEs from among reserved IUEs, of the plurality of IUEs, that are reserved for moving WQEs of respective scheduling groups into the IUE resource;
the group count is a total number of IUEs, of the plurality of IUEs, that are occupied by respective WQEs that belong to the scheduling group and have never been scheduled by the work scheduler; and
the group maximum threshold is a maximum number of IUEs, of the plurality of IUEs, that are permitted to be occupied by WQEs that are from the scheduling group and that have never been scheduled by the work scheduler.

41. The method of claim 40, wherein the IUE resource includes the per-group IAQ for the scheduling group and a per-group conflict queue for the scheduling group and wherein the WQEs that are from the scheduling group and that have never been scheduled occupy respective IUEs of: the per-group IAQ, per-group conflict queue, or a combination thereof.

42. The method of claim 41, wherein the positive result is further based on determining that a group count is less than or equal to a group reserved threshold or that a) the free count is greater than a reserved free count, wherein the reserved free count is counted as part of the free count, and b) the group count is less than a group maximum threshold.

43. The method of claim 24, wherein, in an event the IUA count is greater than or equal to the IUA threshold, the method further comprises disregarding the WQE from consideration for movement into the IUE resource.

44. The method of claim 24, wherein the IUA resource includes at least one lookup table and wherein the retrieving includes:
retrieving from a lookup table of the at least one lookup table, the lookup table storing a plurality of respective IUA count and IUA threshold pairings each associated with a respective IUA identifier.

45. The method of claim 24, wherein the WQE includes:
an identifying pointer;
a tag value, the tag value associating the WQE with a unique work-flow;
a tag-type, the tag-type specifying whether the unique work-flow is ordered, atomic, or un-ordered; and
a group identifier, the group identifier corresponding to the scheduling group.

46. A virtualized scheduler comprising:
an in-unit accounting (IUA) resource configured to store, in association with an IUA identifier, an IUA count and IUA threshold, the IUA count representing a global count of work-queue entries (WQEs) that are associated with the IUA identifier and occupy respective in-unit entries (IUEs) of an in-unit entry (IUE) resource, the IUA threshold set to limit the global count;
a work scheduler configured to schedule WQEs occupying respective IUEs in the IUE resource to respective workslots for processing by respective work processing entities assigned to the respective workslots; and
an arbiter configured to retrieve the IUA count and IUA threshold from the IUA resource, based on the IUA identifier, and to control, as a function of the IUA count and IUA threshold retrieved, whether a work-queue entry (WQE) from a scheduling group, assigned to the IUA identifier, is moved from a per-group transitory admission queue (TAQ) into the IUE resource to be queued for scheduling by the work scheduler, the per-group TAQ assigned to the scheduling group.

47. A network services processor comprising:
a plurality of processor cores;
an in-unit accounting (IUA) resource, the IUA resource configured to store, in association with an IUA identifier, an IUA count and IUA threshold, the IUA count representing a global count of work-queue entries (WQEs) that are associated with the IUA identifier and occupy respective IUEs of an in-unit entry (IUE) resource, the IUA threshold set to limit the global count;
a work scheduler configured to access the IUE resource; and
an arbiter configured to move a work-queue entry (WQE) from a per-group transitory admission queue (TAQ) into a per-group in-unit admission queue (IAQ) in the IUE resource to be queued for scheduling by the work scheduler, the per-group TAQ and per-group IAQ assigned to the scheduling group, the arbiter further configured to retrieve the IUA count and IUA threshold from the IUA resource, based on the IUA identifier, and to control, as a function of the IUA count and IUA threshold retrieved, whether the WQE from the scheduling group, assigned to the IUA identifier, is moved into the IUE resource to be queued for scheduling by the work scheduler for processing by a processor core of the plurality of processor cores or a thread executing on the processor core.

* * * * *

UNITED STATES PATENT AND TRADEMARK OFFICE
CERTIFICATE OF CORRECTION

PATENT NO. : 11,635,987 B2
APPLICATION NO. : 17/680058
DATED : April 25, 2023
INVENTOR(S) : Zebchuk et al.

It is certified that error appears in the above-identified patent and that said Letters Patent is hereby corrected as shown below:

On the Title Page

In Item (56), under "OTHER PUBLICATIONS", in Column 2, Lines 1-2, delete "{SR-IOV),"" and insert --(SR-IOV),"--

In Item (57), under "ABSTRACT", in Column 2, Line 12, delete "IUE" and insert --WQE--

In the Specification

In Column 4, Line 19, delete "thereof" and insert --thereof.--

In Column 8, Line 14, delete "FIG. 1B." and insert --FIG. 1B,--

In Column 14, Line 64, delete "but which are" and insert --but are--

In Column 15, Line 39, delete "(not shown)." and insert --(not shown),--

In Column 16, Line 5, delete "FIG." and insert --FIGS.--

In Column 18, Line 60, delete "expression" and insert --expression (1).--

In Column 20, Line 22, delete "RSVD-THR," and insert --RSVD_THR,--

In Column 20, Line 47, delete "scheduler" and insert --schedule--

In the Claims

In Column 28, Line 2, in Claim 10, delete "TUEs" and insert --IUEs--

Signed and Sealed this
Twenty-eighth Day of May, 2024

Katherine Kelly Vidal
*Director of the United States Patent and Trademark Office*

CERTIFICATE OF CORRECTION (continued)
U.S. Pat. No. 11,635,987 B2

In Column 28, Line 20, in Claim 13, delete "TUEs" and insert --IUEs--

In Column 30, Line 53, in Claim 33, delete "TUE" and insert --IUE--